United States Patent
Palmer et al.

(10) Patent No.: US 11,260,878 B2
(45) Date of Patent: *Mar. 1, 2022

(54) VEHICLE FUEL CONSUMPTION MONITOR AND FEEDBACK SYSTEMS

(71) Applicant: SmartDrive Systems, Inc., San Diego, CA (US)

(72) Inventors: Jason Palmer, Carlsbad, CA (US); Slaven Sljivar, San Diego, CA (US)

(73) Assignee: SmartDrive Systems, Inc., Dallas, TX (US)

( * ) Notice: Subject to any disclaimer, the term of this patent is extended or adjusted under 35 U.S.C. 154(b) by 376 days.

This patent is subject to a terminal disclaimer.

(21) Appl. No.: 16/280,922

(22) Filed: Feb. 20, 2019

(65) Prior Publication Data

US 2019/0176847 A1    Jun. 13, 2019

Related U.S. Application Data

(63) Continuation of application No. 15/478,019, filed on Apr. 3, 2017, now Pat. No. 10,246,104, which is a
(Continued)

(51) Int. Cl.
*B60W 50/14* (2020.01)
*B60W 40/10* (2012.01)
(Continued)

(52) U.S. Cl.
CPC ......... *B60W 50/14* (2013.01); *B60R 16/0236* (2013.01); *B60W 30/18009* (2013.01);
(Continued)

(58) Field of Classification Search
None
See application file for complete search history.

(56) References Cited

U.S. PATENT DOCUMENTS 2,943,141 A    6/1960  Knight
3,634,866 A    1/1972  Meyer
(Continued)

FOREIGN PATENT DOCUMENTS

CA    2469728        12/2005
CA    2469728 A1     12/2005
(Continued)

OTHER PUBLICATIONS

Adaptec published and sold its VideoOh! DVD software USB 2.0 Edition in at least Jan. 24, 2003. (1 pg.).
(Continued)

*Primary Examiner* — Jonathan M Dager
*Assistant Examiner* — Garrett F Evans
(74) *Attorney, Agent, or Firm* — Esplin & Associates, PC

(57) ABSTRACT

Excess fuel consumption monitor and feedback systems for vehicles include sensor arrays of two primary types including those sensors deployed as part of a vehicle manufacturer established sensor suite and sensors deployed as aftermarket sensors. Together, these sensor suites include sensors coupled to vehicle subsystems and operating environments associated with the vehicle. Data from these sensors may be used as parametric inputs to drive algorithmic calculations which have outputs that express excess fuel consumption. Expressions of excess fuel consumption may be made instantaneously as real-time feedback to a vehicle operator/driver and/or a fleet manager as part of a summary report.

18 Claims, 5 Drawing Sheets

Related U.S. Application Data continuation of application No. 14/076,511, filed on Nov. 11, 2013, now Pat. No. 9,610,955.

(51) Int. Cl.
  *B60R 16/023* (2006.01)
  *B60W 30/18* (2012.01)

(52) U.S. Cl.
  CPC ....... *B60W 40/10* (2013.01); *B60K 2370/174* (2019.05); *B60W 2050/146* (2013.01); *B60W 2420/42* (2013.01); *B60W 2510/06* (2013.01); *B60W 2510/10* (2013.01); *B60W 2510/18* (2013.01); *B60W 2520/00* (2013.01); *B60W 2520/14* (2013.01); *B60W 2520/16* (2013.01); *B60W 2520/18* (2013.01); *B60W 2530/209* (2020.02); *B60W 2555/00* (2020.02); *Y02T 10/84* (2013.01)

(56) References Cited

U.S. PATENT DOCUMENTS

| | | |
|---|---|---|
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | dAlayer de Costemore dArc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hu/tter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van Blessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio, IV |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley, Jr. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,505,076 A | 4/1996 | Parkman |
| 5,513,011 A | 4/1996 | Matsumoto |
| 5,515,285 A | 5/1996 | Garrett, Sr. |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |

(56) References Cited

U.S. PATENT DOCUMENTS

| | | |
|---|---|---|
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Bats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Man |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | FantJr |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van Ryzin |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,018,696 A | 1/2000 | Matsuoka |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Seaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,317,682 B1 | 11/2001 | Ogura |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Lannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |

(56) References Cited

U.S. PATENT DOCUMENTS

| | | |
|---|---|---|
| 6,411,874 B2 | 6/2002 | Morgan |
| 6,421,080 B1 | 7/2002 | Lambert |
| 6,429,773 B1 | 8/2002 | Schuyler |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,526,352 B1 | 2/2003 | Breed |
| 6,529,159 B1 | 3/2003 | Fan |
| 6,535,804 B1 | 3/2003 | Chun |
| 6,552,682 B1 | 4/2003 | Fan |
| 6,553,308 B1 | 4/2003 | Uhlmann |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,954,689 B2 | 10/2005 | Hanson |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 | 4/2006 | Prokoski |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,103,460 B1 | 9/2006 | Breed |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 | 7/2008 | Kernwein |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,596,439 B2 | 9/2009 | Oesterling |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |

(56) References Cited

U.S. PATENT DOCUMENTS

| | | |
|---|---|---|
| 7,853,376 B2 | 12/2010 | Peng |
| 7,868,912 B2 | 1/2011 | Venetianer |
| 7,893,958 B1 | 2/2011 | DAgostino |
| 7,904,219 B1 | 3/2011 | Lowrey |
| 7,940,250 B2 | 5/2011 | Forstall |
| 7,941,258 B1 | 5/2011 | Mittelsteadt |
| 7,974,748 B2 | 7/2011 | Goerick |
| 7,984,146 B2 | 7/2011 | Rozak |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,423,009 B2 | 4/2013 | Srinivasan |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,373,203 B1 | 6/2016 | Fields |
| 9,607,526 B1 | 3/2017 | Hsu-Hoffman |
| 9,610,955 B2 | 4/2017 | Palmer |
| 9,715,711 B1 | 7/2017 | Konrardy |
| 9,754,325 B1 | 9/2017 | Konrardy |
| 9,767,516 B1 | 9/2017 | Konrardy |
| 9,786,154 B1 | 10/2017 | Potter |
| 9,792,656 B1 | 10/2017 | Konrardy |
| 9,805,423 B1 | 10/2017 | Konrardy |
| 9,805,601 B1 | 10/2017 | Fields |
| 9,858,621 B1 | 1/2018 | Konrardy |
| 9,868,394 B1 | 1/2018 | Fields |
| 9,870,649 B1 | 1/2018 | Fields |
| 9,942,526 B2 | 4/2018 | Plante |
| 10,185,999 B1 | 1/2019 | Konrardy |
| 10,222,228 B1 | 3/2019 | Chan |
| 10,360,739 B2 | 7/2019 | Palmer |
| 10,404,951 B2 | 9/2019 | Plante |
| 10,497,187 B2 | 12/2019 | Palmer |
| 10,682,969 B2 | 6/2020 | Plante |
| 10,706,648 B2 | 7/2020 | Plante |
| 10,818,112 B2 | 10/2020 | Palmer |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0020902 A1 | 9/2001 | Tamura |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Seaman |
| 2002/0138587 A1 | 9/2002 | Koehler |
| 2002/0156558 A1 | 10/2002 | Hanson |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0170064 A1 | 11/2002 | Monroe |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0055666 A1 | 3/2003 | Roddy |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081123 A1 | 5/2003 | Rupe |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0137194 A1 | 7/2003 | White |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0201875 A1 | 10/2003 | Kuo |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0032493 A1 | 2/2004 | Franke |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |

(56) References Cited

U.S. PATENT DOCUMENTS

| | | |
|---|---|---|
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0257208 A1 | 12/2004 | Huang |
| 2004/0267419 A1 | 12/2004 | Jeng |
| 2005/0021199 A1 | 1/2005 | Zimmerman |
| 2005/0038581 A1 | 2/2005 | Kapolka |
| 2005/0043869 A1 | 2/2005 | Funkhouser |
| 2005/0060070 A1 | 3/2005 | Polka |
| 2005/0060071 A1 | 3/2005 | Winner |
| 2005/0065682 A1 | 3/2005 | Kapadia |
| 2005/0065716 A1 | 3/2005 | Timko |
| 2005/0068417 A1 | 3/2005 | Kreiner |
| 2005/0073585 A1 | 4/2005 | Ettinger |
| 2005/0078423 A1 | 4/2005 | Kim |
| 2005/0083404 A1 | 4/2005 | Pierce |
| 2005/0088291 A1 | 4/2005 | Blanco |
| 2005/0096836 A1 | 5/2005 | Minami |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171663 A1 | 8/2005 | Mittelsteadt |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0205719 A1 | 9/2005 | Hendrickson |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0243171 A1 | 11/2005 | Ross |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0025907 A9 | 2/2006 | Kapolka |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0158349 A1 | 7/2006 | Oesterling |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0259933 A1 | 11/2006 | Fishel |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0088488 A1 | 4/2007 | Reeves |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |

(56) References Cited

U.S. PATENT DOCUMENTS

| | | |
|---|---|---|
| 2007/0143499 A1 | 6/2007 | Chang |
| 2007/0150138 A1 | 6/2007 | Plante |
| 2007/0150140 A1 | 6/2007 | Seymour |
| 2007/0159309 A1 | 7/2007 | Ito |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0217670 A1 | 9/2007 | Bar-Am |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0256481 A1 * | 11/2007 | Nishiyama ............... G01F 9/02 73/114.52 |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0169625 A1 | 7/2011 | James |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0065834 A1 | 3/2012 | Senart |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0203402 A1 | 8/2012 | Jape |
| 2012/0210252 A1 | 8/2012 | Fedoseyeva |
| 2012/0269383 A1 | 10/2012 | Bobbitt |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |

(56) References Cited

U.S. PATENT DOCUMENTS

| | | |
|---|---|---|
| 2013/0006469 A1 | 1/2013 | Green |
| 2013/0018534 A1 | 1/2013 | Hilleary |
| 2013/0021148 A1 | 1/2013 | Cook |
| 2013/0028320 A1 | 1/2013 | Gardner |
| 2013/0030660 A1 | 1/2013 | Fujimoto |
| 2013/0046449 A1 | 2/2013 | Yuecel |
| 2013/0048795 A1 | 2/2013 | Cross |
| 2013/0052614 A1 | 2/2013 | Mollicone |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1 | 6/2013 | Lee |
| 2013/0170762 A1 | 7/2013 | Marti |
| 2013/0189649 A1 | 7/2013 | Mannino |
| 2013/0197774 A1 | 8/2013 | Denson |
| 2013/0209968 A1 | 8/2013 | Miller |
| 2013/0274950 A1 | 10/2013 | Richardson |
| 2013/0278631 A1 | 10/2013 | Border |
| 2013/0317711 A1 | 11/2013 | Plante |
| 2013/0332004 A1 | 12/2013 | Gompert |
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0089504 A1 | 3/2014 | Scholz |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0232863 A1 | 8/2014 | Paliga |
| 2014/0270684 A1 | 9/2014 | Jayaram |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2014/0339374 A1 | 11/2014 | Mian |
| 2015/0000415 A1 | 1/2015 | Kelley |
| 2015/0015617 A1 | 1/2015 | Yeo |
| 2015/0035665 A1 | 2/2015 | Plante |
| 2015/0057512 A1 | 2/2015 | Kapoor |
| 2015/0057836 A1 | 2/2015 | Plante |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0156174 A1 | 6/2015 | Fahey |
| 2015/0170428 A1 | 6/2015 | Harter |
| 2015/0189042 A1 | 7/2015 | Sun |
| 2015/0203116 A1 | 7/2015 | Fairgrieve |
| 2015/0022449 A1 | 8/2015 | Salinger |
| 2015/0222449 A1 | 8/2015 | Salinger |
| 2015/0317846 A1 | 11/2015 | Plante |
| 2015/0371462 A1 | 12/2015 | Ramesh |
| 2016/0054733 A1 | 2/2016 | Hollida |
| 2016/0182170 A1 | 6/2016 | Daoura |
| 2017/0301220 A1 | 10/2017 | Jarrell |
| 2018/0025636 A1 | 1/2018 | Boykin |
| 2018/0033300 A1 | 2/2018 | Hansen |
| 2019/0176837 A1 | 6/2019 | Williams |
| 2019/0180524 A1 | 6/2019 | Palmer |
| 2019/0279441 A1 | 9/2019 | Palmer |
| 2019/0389307 A1 | 12/2019 | Plante |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 244694 | 9/1926 |
| GB | 2268608 A | 1/1994 |
| GB | 2402530 | 12/2004 |
| GB | 2402530 A | 12/2004 |
| GB | 2447184 B | 9/2008 |
| GB | 2451485 | 2/2009 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 5/2009 |
| KR | 20000074416 | 12/2000 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 002841 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 03045514 | 6/2003 |
| WO | 2004066275 | 8/2004 |
| WO | 2005095175 A1 | 10/2005 |
| WO | 2006022824 | 3/2006 |
| WO | 2006022824 A2 | 3/2006 |
| WO | 2007067767 | 1/2007 |
| WO | 2007109091 | 9/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

Ambulance Companies Use Video Technology to Improve Driving Behavior, Ambulance Industry Journal, Spring 2003 (2 pgs.).

(56) References Cited

OTHER PUBLICATIONS

Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of United States U.S. Appl. No. 11/566,424 (13 pgs.).
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill, 'DriveCam—FAQ', Dec. 12, 2003 (3 pgs.).
Bill Siuru, 'DriveCam Could Save You Big Bucks', Land Line Magazine, May-Jun. 2000 (1 pg.).
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/fiash/articles/vidtemplate_mediapreso_flash8.html (13 pgs.).
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Drivecam, Inc., User's Manual for Drivecam Video Systems' Hindsight 20/20 Software Version 4.0 (2003). (54 pgs.).
Drivecam, Inc.'s Infringement Contentions Exhibit A, U.S. Pat. No. 6,389,340, Document 34.1, Oct. 20, 2011. (10 pgs.).
Drivecam, Inc.'s Infringement Contentions Exhibit B, U.S. Pat. No. 7,659,827. Aug. 19, 2011. (29 pgs.).
Drivecam, Inc.'s Infringement Contentions Exhibit B, U.S. Pat. No. 7,804,426, Document 34.2, Oct. 20, 2011. (20 pg.).
Drivecam, Inc.'s Infringement Contentions Exhibit C, U.S. Pat. No. 7,659,827, Document 34.3, Oct. 20, 2011. (17 pgs.).
Drivecam, Inc.'s Infringement Contentions Exhibit C, U.S. Pat. No. 7,804,426. Aug. 19, 2011. (47 pgs.).
Drivecam, Inc.'s Infringement Contentions Exhibit D, Document 34.4, Oct. 20, 2011. (2 pgs.).
DriveCam—Illuminator Data Sheet, Oct. 2, 2004. (1 pg.).
Drivecam.com as retrieved by the Internet Wayback Machine as of Mar. 5, 2005(1 pg.).
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011. (6 pgs.).
DriveCam Driving Feedback System, Mar. 15, 2004 (12 pgs.).
DriveCam Extrinsic Evidence with Patent LR 4.1 .a Disclosures, Nov. 3, 2011. (1 pg.).
DriveCam Extrinsic Evidence with Patent LR 4.1 .a Disclosures, Nov. 8, 2011. (1 pg.).
Driver Feedback System, Jun. 12, 2001 (1 pg.).
First Amended Answer to Amended Complaint and First Amended Counterclaims; and Demand for Jury Trial in *DriveCam, Inc. v. SmarDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmarDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmarDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmarDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'Hindsight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys-ub.--Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet', Oct. 26, 2001 (2 pgs.).
International Search Report and Written Opinion issued in PCT/US07/68325 dated Feb. 27, 2008. (10 pgs.).
International Search Report and Written Opinion issued in PCT/US07/68325 dated Feb. 27, 2008. (2 pgs.).
International Search Report and Written Opinion issued in PCT/US07/68328 dated Oct. 15, 2007. (2 pgs.).
International Search Report and Written Opinion issued in PCT/US07/68329 dated Mar. 3, 2008. (10 pgs.).
International Search Report and Written Opinion issued in PCT/US07/68332 dated Mar. 3, 2008. (8 pgs.).
International Search Report and Written Opinion issued in PCT/US07/68334 dated Mar. 5, 2008. (11 pgs).

(56) References Cited

OTHER PUBLICATIONS

International Search Report for PCTUS2006/47055, dated Mar. 20, 2008 (2 pages).
International Search Report issued in PCT/US2006/47042 dated Feb. 25, 2008 (3pgs.).
J. Gallagher, 'Lancer Recommends Tech Tool', Insurance and Technology Magazine, Feb. 2002 (1 pg.).
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infra-red Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to Hindsight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Kathy Latus (Latus Design), 'Case Study—Time Warner Cable', Sep. 23, 2005. (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995). (4 pgs.).

Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003 (2 pgs.).
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983) (1 pg.).
Patent Abstracts of Japan vol. 011, No. 292 (E-543), Sep. 19, 2987 (Sep. 19, 2987) & JP 62 091092 A (OK ENG:KK), Apr. 25, 1987 (Apr. 25, 1987) (1 pg.).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987) (1 pg.).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990) (1 pg.).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992) (1 pg.).
Patent Abstracts of Japan vol. 017, No. 521 (E-1435), Sep. 20, 1993 (Sep. 20, 1993) & JP05 137144 A (Kyocera Corp), Jun. 1, 1993 (Jun. 1, 1993) (7 pgs.).
Patent Abstracts of Japan vol. 1996, No. 09, Sep. 30, 1996 (Sep. 30, 1996) & JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997) (1 pg.).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998) (1 pg.).
PCT/US2010/022012, Invitation to Pay Additional Fees with Communication of Partial International Search, dated Jul. 21, 2010. (4 pgs.).
Peter G. Thurlow, Letter (including exhibits) Regarding Patent Owner's Response to Initial Office Action in Ex Parte Reexamination, dated Mar. 27, 2012. (78 pgs.).
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).
Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmarDrives Systems, Inc's Production, SO14246-S014255, Nov. 16, 2011 (1 pg.).

(56) References Cited

OTHER PUBLICATIONS

Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems And Networks Having Integrated Cellular Wireless Communications Systems" (29 pgs.).
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
USPTO Non-Final Office Action for U.S. Appl. No. 14/036,299, dated Aug. 12, 2014. (14 pgs.).
USPTO Non-Final Office Action for U.S. Appl. No. 11/296,907, dated Mar. 22, 2007 (17 pages).
USPTO Non-final Office Action dated Aug. 27, 2009 during prosecution of United States U.S. Appl. No. 11/566,424 (25 pgs.).
USPTO Non-Final Office Action dated Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).

Written Opinion issued in PCT/US07/68328 dated Oct. 15, 2007. (3 pgs.).
Written Opinion of the International Searching Authority for PCT/US2006/47042. dated Feb. 25, 2008 (5 pages).
Written Opinion of the International Searching Authority for PCT/US2006/47055, dated Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' Hindsight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dadted Apr. 1, 2015, 7 pages.
Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, datd Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.

(56) References Cited

OTHER PUBLICATIONS

USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel OBD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1.1.02, Jan. 2011, p. 21.
USPTO Non-Final Office Action dated Jan. 4, 2016 in U.S. Appl. No. 14/529,134, filed Oct. 30, 2014 (65 pgs).
PCT International Search Report and Written Opinion for PCT/IB16/51863, dated Sep. 16, 2016 (18 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.
PCT International Search Report and Written Opinion for PCT/US2016/012757 dated Mar. 18, 2016 (11 pgs.).
History of the web browser, Wikipedia (Year: 2019).

\* cited by examiner

VEHICLE FUEL CONSUMPTION MONITOR AND FEEDBACK SYSTEMS

FIELD

This disclosure relates to vehicle fuel consumption monitoring and feedback with respect to driver behavior management.

BACKGROUND

High gas prices provide an incentive for fleet vehicle operations managers to deploy systems designed to improve fuel consumption. While systems have been designed to improve efficiency of internal combustion engines, few are directed to improve driver behavior. As opportunities to conserve fuel become important to fleet managers, vehicle fuel consumption systems which help modify driver behavior become more valuable. There presently exists an unserved need for fuel conservation systems which are primarily directed to modification of driver behavior.

Systems that warn a driver of increased fuel consumption are known. For example, known systems detect aggressive acceleration maneuvers and deceleration maneuvers that may be inconsistent with careful fuel consumption and provide indications that this driving behavior has occurred. These systems are problematic because they are inaccurate and have low fidelity, which tends to result in these systems being ignored and dismissed as incorrect. It is sometimes necessary to handle a car with assertiveness under some circumstances. A driver would ignore a message telling him about increased fuel consumption during such maneuvers because the maneuvers may have been necessary under the traffic conditions.

Some known systems provide an analog fuel consumption meter that indicates fuel consumption rates in a 'miles per gallon' estimate via a moving needle gauge. Anytime a driver depresses the accelerator in a vehicle with such a system, the gauge moves promptly to near zero, and anytime the driver removes pressure from the accelerator the gauge promptly moves to +30 mpg (for example). These gauges are routinely ignored by drivers as even a most inattentive driver is aware that depressing the accelerator results in fuel consumption.

Known systems do not provide information related to excess fuel consumption. The gauges described above may indicate increased fuel consumption but they do not indicate excess consumption of fuel. Known systems do not compare an actual amount of fuel used to an amount that should have been used given the situation.

Know systems typically do not use information from aftermarket sensors added to the vehicle to determine the increased fuel consumption. For example, known systems do not include accelerometers. Known systems simply calculate a decrease in speed over time (e.g., using the same information used by the vehicle's speedometer) and conclude that there was a hard braking event that was either unsafe or wasted fuel. Known systems do not calculate the ideal fuel consumption for that maneuver. Known systems do not provide actionable information in real time. Known systems do not consolidate information for the driver and/or the driver's manager (for example) so they can review the information and better understand how to improve fuel efficiency.

SUMMARY

One aspect of this disclosure may relate to an excess fuel consumption monitor and feedback system. The excess fuel consumption monitor and feedback system may include devices and/or methods for providing feedback to drivers and/or their managers. The feedback may be directed to modification of driver behavior. This system may be integrated with a vehicle and/or monitor vehicle use. Vehicles may include, for example, cars, trucks, busses, and/or other vehicles. This system may provide feedback which relates to excess fuel consumption. It is a contrast to prior art methods and devices that the system taught herein does not depend upon single-function transducers having simple signals, but rather may depend upon multiple cooperating sensors having compound output signals. In some implementations, the sensors may be and/or include one or more transducers. This system may include advanced algorithms to make determinations regarding driver behavior modification and/or to further present easy to read and understand feedback directed to achieving driver behavior modification objectives.

The excess fuel consumption monitor and/or feedback system described herein may be configured to provide operators of motor vehicles real time feedback, after-the-fact feedback which relates to excessive fuel consumption, and/or other feedback. Electronic transducers coupled to various vehicle subsystems or vehicle environments may provide signals to a logic processor which executes stored program code. Execution of this program code in view of the signals provided by the transducers may lead to feedback indications, direct and/or indirect, which may be provided to vehicle operators. Feedback may be useful as it may be used by drivers and/or fleet managers to effect driver behavior modifications which improve fuel use with respect to excess consumption and efficiency. The excess fuel consumption monitor and/or feedback systems described herein may indicate excessive fuel consumption for a fleet of vehicles. The excessive fuel consumption of individual fleet vehicles may be related to specific maneuvers performed by a driver operating the individual vehicle.

System transducers and/or measurement apparatus may be arranged to measure vehicle states/parameters and/or subsystem performance with a view towards efficient fuel use. Vehicle subsystems such as the engine, brakes, steering, transmission, and/or other mechanical systems may be interrogated and/or measured to provide these systems information from which excess fuel consumption calculations may be made. The vehicle subsystems may include one or more sensors configured to generate output signals conveying information from which excess fuel consumption calculations may be made. Further, output signals related to vehicle states, operational conditions, parameters, and/or other information may also be generated to provide additional information from which fuel use may be calculated. For example, vehicle accelerations and/or orientations may be used in some algorithms to estimate appropriate fuel consumption for a particular circumstance in which a vehicle is being operated. Continuing with the example, information related to a vehicle's throttle position, engine load, rpm, speed, actual fuel consumption, accelerometer sensors, and/or other information may be combined to determine ideal fuel consumption. In some implementations, imaging devices may record video about a vehicle's surroundings and/or environment. Those images may be used in some algorithms to deduce information related to fuel use and/or excessive fuel use. This system may receive information (e.g., physical measurement values) from a plurality of supporting subsystems. Fuel use conclusions (in particular excess fuel consumption) may be drawn based on the received information, the algorithms and/or other rules and/or information.

Based upon the signals received from the various vehicle subsystems, determined vehicle operational states and/or status, determined vehicle parameters, determined environmental conditions, and/or other information, feedback relating to excess fuel consumption may be provided to drivers, their managers, and/or other users. Feedback may be provided as an indicator perceptible to a driver while operating a vehicle, and/or as an 'after-the-fact' indicator for use after the conclusion of vehicle operation. The indicator perceptible to the driver while operating the vehicle may be embodied as an audible voice, a tone, a visual indicator, a message displayed via a user interface (e.g., a touchscreen), and/or signals safely perceptible to a driver while operating a vehicle. Such feedback may be provided instantly, and/or almost instantly, during operation of a vehicle. For example, the audio speaker may be controlled to provide a voice reminder relating to excess fuel consumption. The voice reminder may be similar to verbal navigation instructions given by navigation devices, for example. The audible voice may say, "excessive acceleration" and/or "excessive braking", for example. Alternatively, and/or in conjunction therewith, an audio speaker may be used to play a negative indicator such as a buzzer noise or a positive sound such as a 'ding' to indicate negative and/or positive conditions relating to excess fuel consumption. As another example, a red-yellow-green array of LEDs may be used to directly indicate to a driver 'bad', 'neutral', and 'good' driving conditions with respect to excess fuel consumption by illumination of corresponding light colors. In some implementations, the system may include a touchscreen display configured to receive entry and/or selection of information from a driver and/or other users. In some implementations, the touchscreen display may be configured to provide feedback to the driver (e.g., via the indicators described above) and/or feedback to other users. The instantaneous feedback provided to a driver may be based on program code executed in real-time by one or more processors included in the system.

In some embodiments, feedback may be provided to a user (e.g., the driver, the driver's manager, and/or other users) via a mobile computing device (e.g., a smartphone, a laptop computer, etc.) associated with the driver, the driver's manager, the vehicle, and/or the vehicle fuel consumption monitor system. In some implementations, feedback may be provided via an electronic application (e.g., an "app") run on the mobile computing device. Feedback may be provided to a driver located in the vehicle, and/or a user (e.g., the driver's manager) located remotely from the vehicle via the mobile device and/or the application.

In some implementations, feedback relating to excess fuel consumption may be provided as an after-the-fact indicator of fuel consumption. Feedback in agreement with such versions may be arranged as reports to be consumed visually by interested parties (e.g., a driver and/or her manager). An excess fuel consumption report provided as after-the-fact feedback may be arranged to relate to a single driver or a class of drivers or a single vehicle or a class of vehicles.

In some implementations, the system may be configured to detect driver maneuvers associated with excess fuel consumption. Responsive to detection of such a driving maneuver, the system may trigger a video recorder to record the maneuver. In some implementations, some and/or all of the information generated by the vehicle excess fuel consumption monitor system may be transmitted to a remote location and/or reviewed by review analysts and/or other users. The review analysts may score a driver's behavior based on his or her excess fuel consumption. The after-the-fact feedback may be based on, for example, how a review analyst scores a maneuver recorded in the video of the event. The system may be optimized based on the review by the review analysts and/or other users who analyze the information (e.g., including video) for proper fuel saving driving techniques. Optimizing the system may include adjusting the program code, one or more algorithms used by the system to determine a driving maneuver related to excess fuel consumption, and/or other characteristics of the system, for example. Depending on what types of scores the analysts assign to different driving skills/maneuvers expressed by the transmitted information, the system may adjust program code, algorithms, parameters, and/or other information related to those maneuvers/skills for a specific class of vehicle driven when the information was generated. This adjusted program code, adjusted algorithms, adjusted parameters, the review analyst scoring, and/or other information may be incorporated into the after-the-fact feedback.

In some implementations, the system may include couplings configured to couple with common pre-installed vehicle electronic subsystems in widespread and standardized use. In some implementations, the fuel monitor and/or feedback system taught herein may be coupled to vehicle engine subsystems by way of a vehicle's engine computer. The term engine computer may include and/or refer to an onboard diagnostic system (OBD), an engine control unit (ECU), an engine control module (ECM), and/or other computing devices common to production vehicles. A vehicle may have one or more engine control modules. The one or more engine control modules may be associated with an engine control unit (ECU), for example.

For example, measurement data supplied by air and fuel flow meters, among others, may be passed from such engine subsystems by way of an engine computer and further made publicly available via a databus, for example, in conventional prescribed formats. In some implementations, by way of an agreement with the vehicle manufacturer for example, the system may access proprietary (to the vehicle manufacturer) signals and/or data output by the engine computer. The system may use data provided by the engine computer as a basis from which some calculations relating to fuel use are made. Further, depending upon the results of these calculations, the system may provide feedback which relates to excess fuel consumption based at least in-part on this data.

The fuel monitor and reporting system presented herein may depend upon data from the engine computer and/or from data provided by custom installed measurement subsystems. In addition to common engine subsystems found in standard vehicles, this fuel monitor system may also receive measurement data from external supporting subsystems integrated along with the fuel monitor.

For example, standard equipped vehicles typically do not include sensors to measure orientation or inclination (inclinometer). However, in some implementations, an inclinometer may be installed to measure vehicle orientation with respect to the horizon. Output signals from the inclinometer may drive algorithm inputs whereby fuel consumption calculations depend upon measured orientation via the inclinometer. Accordingly, while many standard vehicle subsystems may provide measurement values to be used in fuel consumption calculations, the system described herein may include sensors and/or transducers installed as 'after-market' devices.

Excess fuel consumption feedback systems presented herein being coupled to engine subsystems via an engine computer may use data received therefrom in prescribed calculations and in further view of stored preset values, to produce indicator signals which may express excess fuel consumption.

These 'prescribed calculations' may be embodied as stored program code which may be executed in an on board logic processor dedicated to executing this code. Prescribed algorithms may be prepared and encoded and included as an element of this system.

These algorithms include input parameters coupled to physical measurement systems of the vehicle. Values received by the logic processor may be algorithm inputs that are used to produce output values. Algorithm outputs may be compared to reference values in view of predefined rules to produce indicators which relate to excess fuel consumption.

These algorithms, which may depend on a plurality of subsystems, may be used to drive fuel consumption indicators. For example, fuel flow rate measured at a fuel supply line alone is generally insufficient to draw conclusions regarding excess consumption. For example, when trip objectives necessitate delivering a heavy load up a significant incline, a high rate of fuel flow is necessary—but not excessive. Accordingly, the system may also include physical measurements about the vehicle operation environment in addition to vehicle engine subsystems and data from these measurements may be used as parametric input to algorithms having compound dependence upon a plurality of parameters which drive the feedback or indicator given to drivers and fleet managers.

Further, a calculation for what is target (most efficient) fuel consumption may also be effected. Excessive fuel consumption can be defined as the difference between the actual fuel consumption and target fuel consumption. The calculation of this target fuel consumption may be based on one or more algorithms that rely on the data from the engine computer, external (e.g., aftermarket) vehicle sensors (e.g. road grade incline and/or decline angle/percentage), as well as calibration values/vehicle parameters that the algorithm maintains based on its observations of the vehicle performance in other conditions (e.g., what is the most efficient RPM for a given engine load, what is the air resistance factor, etc.). In other words, the system may automatically learn about the vehicle and/or its surroundings, and calculate the target fuel consumption based on the learned information. The calibration/parameter values may become particularly important since differences in these factors can develop over time and after the vehicle is manufactured (e.g. wear and tear, vehicle modification, vehicle maintenance status, etc.) A video camera system may also operate to provide parametric input values to some algorithms to assess excess fuel consumption. For example, video images may be processed in image recognition schemes and/or by analysts to determine the presence of heavy traffic conditions. In heavy 'stop-and-go' traffic, one can expect fuel efficiency to be considerably lower than in conditions where no congestion exists. Accordingly, some algorithms may have inputs to account for information received from a video camera via image processing facility.

In some implementations, a peripheral I/O device may be coupled with the logic processor to enable user inputs, for example. User (e.g. a driver of the vehicle) input may shift the system between alternative operational modes in agreement with particular trip objectives which might demand particular performance. In one example, a touchscreen user I/O device may be deployed in conjunction with the system. A touchscreen display may permit a driver to switch the system between operational modes via menu driven touch gestures. In some implementations, the peripheral I/O device may be controlled, combined with prior video analytics, to indicate to a driver when to shift, what the optimal speed of the vehicle is, and/or other information. The peripheral I/O device may be controlled to provide weather information and/or real time traffic data, for example, provided by a third party to help the driver operate the vehicle more efficiently. In some implementations, the peripheral I/O device may include a mobile computing device (e.g., a smartphone, a laptop computer, etc.) associated with the driver, the driver's manager, the vehicle, and/or the vehicle fuel consumption monitor system.

In consideration of touch input provided by a vehicle operator the system may respond by adjusting algorithms or switching between them in agreement with particular vehicle use purposes. In one example, a driver of an ambulance vehicle may switch the system into an 'emergency mode' whereby fuel efficiency is given less of a priority. In some implementations, the system may automatically switch modes when the ambulance driver turns on his emergency lights. This may cause the system to go into a different fuel performance profile, for example. When an ambulance is operated in non-emergency modes, 'excess fuel consumption' may have a different meaning than when the vehicle is used for emergencies.

Accordingly, the system may be coupled to standard on-board vehicle subsystems like the engine, the brakes, steering, a transmission, the drive-train, and/or other mechanical systems, and additionally coupled to 'aftermarket' measurement devices including video cameras and still further to human interface systems such as graphical user interfaces of a touchscreen display. Inputs from all of these drive execution of prescribed algorithms to produce outputs which indicate excessive fuel consumption. These indicators of excessive fuel consumption may be provided to drivers in real-time as the vehicle is being operated, or additionally as consumption reports provided after the conclusion of a vehicle's service day.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
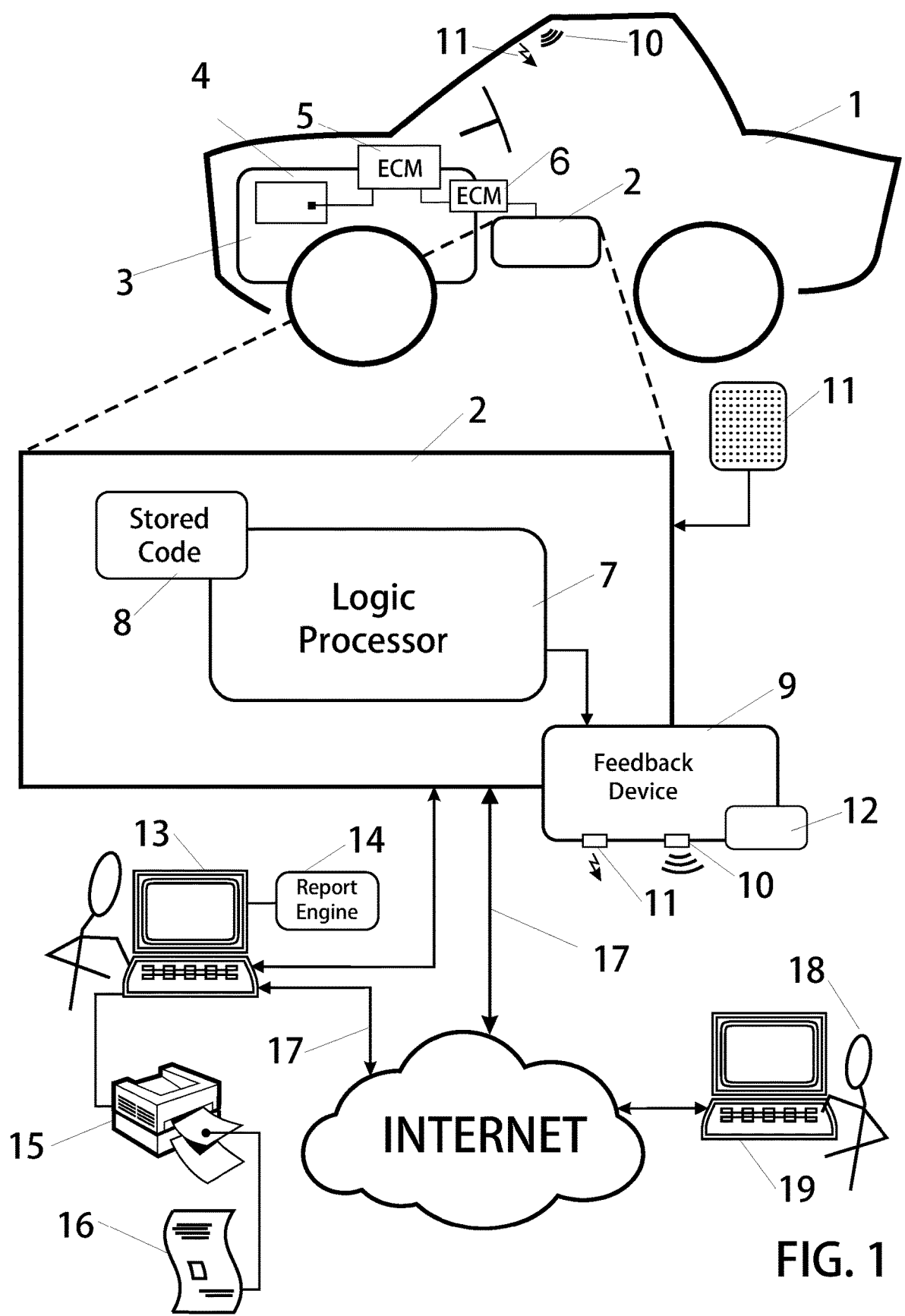
FIG. 1 illustrates a vehicle having installed therein a vehicle mounted component of this system in relation to other vehicle parts and other coupled system components on a communications network.

FIG. 1 illustrates a vehicle fuel consumption monitoring and feedback system. Vehicle 1 may be equipped with a vehicle excess fuel consumption monitor and feedback apparatus 2 of this teaching. Vehicle 1 may be powered by its engine 3 (e.g., an internal combustion engine, a natural gas powered engine, an electrically powered engine, and/or other engines) which includes subsystems 4 associated with internal combustion engines (e.g., an air intake system), natural gas powered engines (e.g., a fuel intake system), electrically powered engines, and/or other engines. Modern production vehicles may include an engine computer (illustrated by one or more engine control modules (ECM) 5, 6, in FIG. 1) which may have a standardized interface to which external devices may be coupled. In some implementations, a vehicle excess fuel consumption monitor and feedback reporter in accordance with this teaching includes a coupling to the engine computer.

Apparatus 2 may acquire data from a multitude of sensors that may be pre-installed in the vehicle and are read via the engine computer, and/or may be installed as additional external sensors. Each sensor generates output signals conveying information related to a direct or indirect measurement of a current state and/or parameter of the vehicle (the vehicle engine, for example). The sensors may include measurement error, and may be polled at a limited rate and/or at mutually-inconsistent and often irregular intervals. Relevant vehicle or engine states/parameters may not be directly measurable through any particular available sensor (e.g., the current vehicle weight (including cargo) or the efficiency of the engine). These states/parameters may need to be determined via an analysis of the sensor measurements by one or more processors of apparatus 2 (e.g., processor 7 described in greater detail below).

In some implementations, the sensor data may need to be interpreted and/or analyzed by the one or more processors. For example, the various sensors may provide redundant and/or inconsistent measurements of the same vehicle or engine state/parameter. For example, vehicle speed may be measured by a wheel speed sensor (e.g., via the ECM) and GPS, while the rate of change of vehicle speed is measured by an accelerometer. The wheel speed sensor may be biased by a difference in assumed and/or actual tire diameter. GPS speed may become unavailable and/or be reported as excessive due to "urban canyon" effects. Acceleration may include extraneous values such as a gravity vector (e.g., if a vehicle is on an incline) and/or a 0 g (centerpoint) bias. The actual and/or real speed of the vehicle may be determined based on the GPS, ECM, accelerometer, and/or other speed information.

These vehicle excess fuel consumption monitor and feedback apparatus include one or more logic processors 7, coupled with prescribed stored program code 8 and further, a feedback indicator unit 9 which is driven under influence of the logic processor to provide feedback signals to vehicle operators and others both in real-time and in after-the-fact summary forms.

After the sensor data is collected by logic processor 7, logic processor 7 may use one or more algorithms (e.g., stored code 9) to model/interpret/analyze relevant vehicle states/parameters (e.g. based on input from one or more sensors whose data may or may not appear to agree). The vehicle states/parameters may be determined in real-time using a discrete time model, for example, where the estimated states/parameters depend on previously estimated states/parameters and new/current measurements. Typical time steps for the ongoing determinations may be about 50 milliseconds, but may range from about 1 microsecond (0.000001 seconds) to about 10 seconds.

The analyzed sensor data from more than one sensor may result in accurate state/parameter values (e.g., compared to parameters determined based on output information from only one sensor). The analyzed sensor data may include states/parameters that are not directly measurable (e.g., total weight of the vehicle, vehicle orientation/inclination). The determined states/parameters may be readily used for downstream logical processing without further data or signal conditioning necessary. A common method for implementing such system state/parameter estimation is the Kalman filter, for example.

Another benefit of this analyzing data from more than one sensor approach may be that the estimated state/parameter values may be available at a higher sampling rate than the individual sensors that directly measure such a state/parameter would allow. For example, a sensor associated with a wheel of the vehicle may provide vehicle speed measurements at the rate of 4-8 times per second. GPS may provide the same parameter at only one time per second. The output from the multi-sensor algorithm (e.g. the Kalman filter) may match the sampling rate of acceleration measurements from which the speed is extrapolated. As such, the estimated vehicle speed may be available at a sampling rate of 1000 times per second (e.g., a typical sampling rate for accelerometers).

Based on the analyzed sensor data, processor 7 may determine a set of vehicle specific stages/parameters that are expected to be fixed for the vehicle and hold true for at least the recent history of the vehicle and/or possibly its entire life. Examples of such states/parameters are the current vehicle loading level (e.g. cargo weight), the weight of the unloaded vehicle, current fuel efficiency of the engine given the wear and tear and the maintenance status (e.g. time since last oil change), number of gears in the transmission, the ratio of each transmission gear, etc.

The set of vehicle specific parameters may be used for downstream calculations that determine factors that may be contributing to the current fuel consumption rate and/or to identify what the target fuel consumption may be in specific scenarios (e.g., driving up an incline).

The vehicle specific parameters may be updated over time. The updates may be based on previously determined parameters and current output from the one or more sensors. The vehicle specific parameters may stabilize at a given level after multiple updates. Because the vehicle specific parameters may be updated over time, the vehicle specific parameters may be electronically stored in electronic storage included in apparatus 2 (e.g., stored with stored code 8). The stored vehicle specific parameters may be persistent and continue to be used after a power cycle of apparatus 2.

The vehicle specific parameters may be of interest to users who may want to, for example, compare parameters across all vehicles of a specific type to generate an indication of specific vehicle maintenance issues that may contribute to increased fuel consumption. The information related to a vehicle type may help direct and/or focus maintenance efforts on that type of vehicle and enhance return on investment for the vehicles because of the maintenance activities.

The vehicle and engine states/parameters, in combination with maneuver-specific algorithms, may be used to detect discrete vehicle maneuvers that may involve excessive consumption of fuel. The maneuvers are necessarily under a driver's control and may include examples such as hard acceleration, hard braking, driving at a constant speed in a suboptimal gear, speeding beyond an optimal top speed, idling unnecessarily, hard cornering, over revving the engine of the vehicle, inefficiently shifting gears, inefficient acceleration, inefficient braking, inefficient operation of the vehicle given prevailing driving conditions, speeding uphill, and/or other maneuvers.

Logic processor 7 may detect when the maneuver starts and ends. Logic processor 7 may use fuel consumption rate output information generated by the sensors to determine (e.g., integrate) the actual fuel consumption that occurred between the maneuver start and maneuver end points. This represents actual fuel consumption which may match the target fuel consumption identified, but will typically exceed the target fuel consumption.

For example, logic processor 7 may determine when idling starts and/or stops, and whether idling is excessive. Logic processor 7 may base its determinations on more than just information from a vehicle ECM (for example) indicating that the power to the vehicle is on (e.g., the key is turned). Logic processor 7 may incorporate information and/or determine metrics that show that the engine of the vehicle was actually running. Logic processor 7 may be configured to incorporate power take off (PTO) idling as a separate measurement for excessive idling (e.g., when a cement truck uses power to dispense cement).

In some implementations, logic processor 7 and/or other components of the system may be configured such that a user may be able to define idling situations which may be removed from consideration for an excessive idling determination. The user may use the system (e.g., the user interface) to define an allowable idling time for the delivery truck which would not trigger an excessive idling determination. Idling situations which may be removed from consideration for an excessive idling determination may include, for example, normal idling while waiting at a stoplight, sitting in stopped traffic on a freeway, and/or other idling. As another example, a package delivery company may allow delivery trucks to remain idling while the driver drops off a package to a customer. As another example, the user may define that idling from 7:30 to 8:00 every morning is allowable, for example, and should not trigger an excessive idling determination.

In some implementations, the determined vehicle parameters, in combination with maneuver-specific algorithms, may be treated differently by the system in areas defined by geo-fences. Geo-fences may electronic boundaries that correspond to and/or define physical locations. The physical locations may be places where a vehicle may be driven. For example, a geo-fence may define a perimeter of a parking lot, a yard for a fleet of vehicles, a geographical area that incorporates one or more different routes (and/or segments of routes) driven by a driver, and/or other physical locations. Within a geo-fence, excess fuel consumption may not determined as it normally would be for the maneuvers described above (and/or other maneuvers) that may involve excessive consumption of fuel. For example, vehicle parameters and an idling algorithm that would normally detect excessive idling may be prevented from doing so while a vehicle is in its home vehicle yard. In some implementations, geo-fences may be used to define specific geographical areas of interest for excess fuel consumption. For example, the system may be configured to determine excess fuel consumed for individual periods of idling within a geo-fence that surrounds a route (and/or portion of a route) driven by a driver.

Logic processor 7 may determine a target fuel consumption for a maneuver based on the sensor data, the vehicle specific parameters, and/or other information. Logic processor 7 may determine the target fuel consumption via custom programmed maneuver-specific algorithms. For example, a first algorithm that corresponds to a first maneuver may be used to determine the target fuel consumption for the first maneuver and a second algorithm that corresponds to a second maneuver may be used to determine the target fuel consumption for the second maneuver. Logic processor 7 may compare the actual fuel consumption amount with the target fuel consumption amount and calculate a difference, which represents a waste of fuel and/or a fuel savings opportunity.

In some implementations, the target fuel consumption for the maneuver may be determined and/or adjusted by the analyzed and/or determined information provided by an analyst who has reviewed the data. The system may identify a heavy fuel consumption driving maneuver and target this maneuver for analyst review. The information determined by the analyst may be incorporated into an algorithm associated with the corresponding maneuver.

In addition to calculating the amount of wasted fuel, apparatus 2 may also identify contributing factors to the fuel waste. For example, in the case of a hard acceleration maneuver, apparatus 2 may identify that the reason for fuel waste in a specific occurrence of that maneuver is because the driver shifted too late from second gear (e.g., beyond the optimal engine speed (RPM) point for second gear). In some implementations, the reason for the fuel waste in the specific occurrence of that maneuver may be identified by an analyst based on video of the maneuver.

Based on the relative amount of wasted fuel as well as the specific contributing factors to the fuel waste, apparatus 2 may provide a driver and/or other users with sensory (e.g., visual, auditory, etc.) feedback. This may help the driver and/or other users associate the maneuver that was just executed with excessive fuel consumption. Timely feedback may help improve the learning process.

In some implementations, an audio transducer (e.g., speaker 10) or light transducer (e.g. LED 11) may provide audio and light signals indicative of prescribed conditions and states relating to fuel consumption. Some versions of this system may include feedback transducer subsystems which are windshield mounted or at least disposed near the driver in the vehicle's driver compartment. For optical and audio transducers to be most effective, these have to be in close proximity to a vehicle operator where she may perceive signals provided without being distracted from driver duties.

Accordingly, a device mounted in a passenger compartment may be optimally placed near a driver whereby the driver may easily receive feedback signals. The signals so perceived by drivers operate to aid in behavior modifications yet do not disturb normal driving duties.

For example, drivers who sometimes aggressively accelerate a vehicle may be provided a voice command, an audible noise, a blinking light, and/or other indicators which remind the driver to more gently engage the accelerator pedal. After just a few of such reminders, a driver may begin to gently use the accelerator 15 naturally and without indicator warnings being needed.

While the preceding is a good example of immediate feedback, this system also supports delayed or non-real-time feedback. This system is also arranged to compile (e.g., histogram) data and convey the data to drivers, their managers, and/or other users via reports which may be consumed visually.

In some implementations, a feedback indicator may include a report engine which may provide paper and/or electronic document outputs in the form of excess fuel consumption reports.

Feedback may be provided as a visual report formed from data provided by the vehicle mounted system (apparatus 2). Data captured throughout the service day may be recorded at a device memory and thereafter transferred to a computing workstation 12 operated by a fleet administrator computing workstation 13. Data conveyed from the apparatus 2 to the workstations may be processed and analyzed and resulting information may be used to drive variables of prescribed templates of a report generator or report engine 14. An executed template based upon information captured during the service day of a fleet vehicle may be rendered as a hardcopy report where the report engine is coupled to a standard computer printer 15 operable for producing paper versions of these reports 16.

Alternatively, an executed template of the report engine may be embodied as an active or 'dynamic' electronic document. An electronic document may be conveyed 17 for example via HTTP over the Internet such that a remotely located fleet administrator 18 may view the report via an Internet browser equipped computing workstation 19.

In review, these vehicle excess fuel consumption monitor and feedback apparatus are arranged to receive data from vehicle subsystems, further receive additional data from other application specific supporting subsystems, analyzing data via prescribed stored algorithms specifically designed with a view to driver behavior modification, and provide feedback to drivers and their administrators and managers. In some cases, feedback may be provided instantly by way of optical or audio signals for instant driver stimulus, or alternatively may be provided as 'after-the-fact' feedback by way of reports which may be consumed by drivers and fleet managers visually.

In addition to the reports, the apparatus may also provide a driver with specific recommendations for what aspect of their driving represents most of the fuel waste. These aspects may be driving habits for which the driver was not even aware of the fact that a specific driving habit causes excess fuel consumption. This may allow the driver to modify his or her driving strategy (e.g., long term habits such as speeding) in addition to reacting to instantaneous feedback.

The recommendations may be highly prescriptive. By way of a non-limiting example, the apparatus may make a recommendation such as, "When driving your fully loaded cement truck up this hill on your route, drive at 25 mph (10 mph below the speed limit) in 3rd gear and at 1800 RPM. This behavior modification alone would improve your fuel waste by 2%, from 18% of fuel wasted to 16% of fuel wasted". These recommendations may include information beyond the information included in the reports and trends described above.

Figure 2:
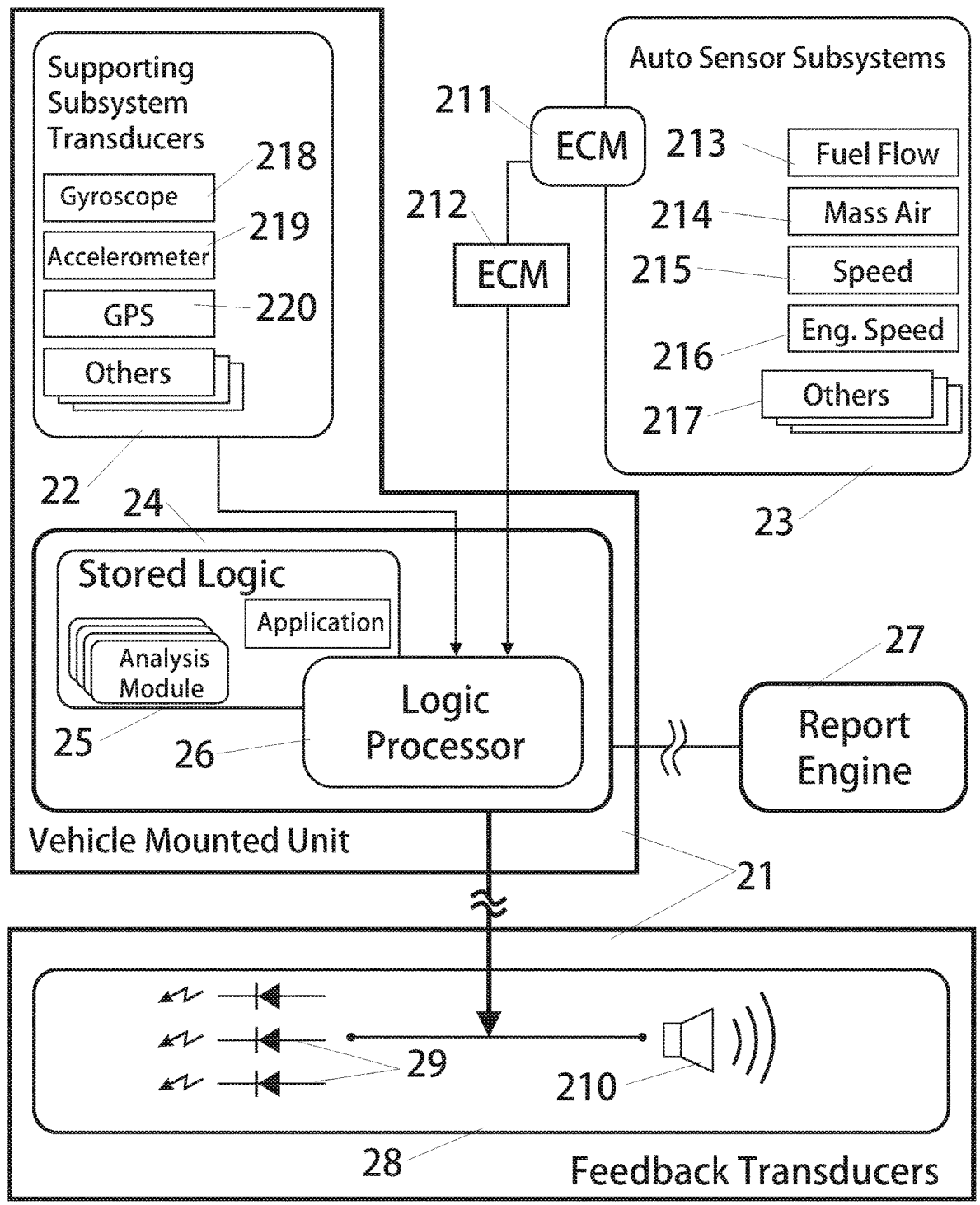
FIG. 2 is a block diagram which illustrates elements of this system and their relationships with coupled elements.

With attention to FIG. 2, the system of this teaching is presented in more detail. The block diagram of FIG. 2 illustrates further elements of this system and/or relationships between coupled elements. In particular, a vehicle mounted unit 21 includes primary supporting external subsystems transducer set 22 to complement already installed auto subsystem transducers, sensors and detectors 23. A logic and analysis system 24 includes logic 25 stored as programming code including: application logic and a plurality of analysis modules which may be selectively called during application execution. A logic processor 26 is in relation to stored code whereby that code may be called and executed by the processor to effect operational modes of the apparatus. Information from vehicle engine subsystems and other supporting subsystems is received by the logic processor as parametric inputs to algorithms of analysis modules which are executed there. Outputs from algorithms so executed drive feedback in several alternative forms.

In some implementations, direct and/or immediate feedback may be provided as a 'real-time' alert signal to a driver while performing driving duties. For example, when a specified circumstance and/or event is detected and/or determined to have occurred and/or is raised as a logic 'event', an alert drive signal from the logic processor may stimulate a visual and/or audio transducer in the vehicle passenger compartment. For example, if strong acceleration due to aggressive turning is detected while simultaneously detecting an increased fuel flow, then a maneuver which is considered unfavorable to fuel consumption may be declared and/or an audible or visual warning may be sent to the driver. As described above, an audible voice, a brief flashing of a 'red light', a buzzer noise transmitted from a system speaker, and/or other indicators may be used to indicate a trigger of a disallowed maneuver. Feedback transducers 28 including: 'green'-'yellow'-'red' LEDs 29 and/or a common speaker 210 may provide physical signals readily perceptible by drivers without overly distracting them from normal driving tasks.

In the preceding example, instant feedback indicators may depend in combination upon at least one sensor of the auto subsystem (e.g., a fuel flow sensor) and/or at least one sensor of an external supporting subsystem considered 'nonstandard' (equipment not generally installed by vehicle manufacturers) and/or not part of manufacturer installed equipment (e.g. accelerometers). Accordingly, it is noted that some analysis modules may have parametric inputs which may depend upon the manufacturer installed sensor and subsystems, some analysis modules may be dependent upon 'aftermarket' sensors installed in a vehicle after its production, and/or some models may be dependent upon both classes of sensors or subsystems.

It should be noted in the example above, that accelerometers may be installed by the vehicle manufacturer as a component of a vehicle subsystem such as electronic stability control (ESC) that requires at least the lateral acceleration measurement. However, data from these accelerometers is typically not accessible to aftermarket devices (e.g. the data is not standardized to be transmitted over the vehicle network/engine computer, and/or it cannot be transmitted at high enough sampling rates).

This system may be arranged to couple and cooperate with standard vehicle communication facilities. As such, in some implementations, this system may gain access to vehicle subsystem sensors by the standard vehicle ECM 211 by way of a second ECM 212. In this way, data captured at the fuel flow subsystem 213 and/or the air mass flow meter 214 may be readily available to be received as input to various analysis module components of the logic which drives the system. Other subsystem sensors (by illustration—but not intended as an exhaustive list) of which other algorithm input may be dependent include: a speedometer 215; and engine speed meter (RPM) 216; among many others 217.

While modern vehicles increasingly have a broad array of support sensors, these nevertheless do not include all transducers which are useful for making excess fuel consumption determinations. As such, this system may include devices to be installed in vehicles (external supporting sensors) which are characterized as non-standard sensors and transducers.

Among these sensors and transducers are two distinct classes including those which may be contained with a primary housing of an installed device having no couplings to vehicle subsystems and those which are installed in close relation or highly coupled to vehicle subsystems.

For example gyroscopes 218, accelerometers 219, and/or geo-location (e.g., GPS position) determining means 220 need not interact with a vehicle subsystem but rather may operate autonomously to measure aspects of the vehicle operating conditions. Conversely, other sensors installed as components of this system may be directly and/or mechanically coupled to vehicle subsystems. For example a thermocouple transducer may be thermally coupled to an engine block. As fuel use may vary with dependence upon engine temperature, some prescribed programs may include those having algorithms dependent upon parametric input values associated with engine temperature. Therefore, those systems are explicitly anticipated to include those in which certain sensors are installed and coupled to vehicle subsystems.

Another example of an additional sensor that may be included in this system is a Pitot tube (not shown in the figure). A Pitot tube may measure/generate output signals related to a wind velocity, an external air temperature and/or external air pressure that would yield the air density, and/or other environmental conditions surrounding the vehicle. These parameters may be used to calculate the energy that is being expended to overcome the aerodynamic drag, for example, which may become the predominant energy term for trucks driving at highway speeds (e.g. 55 mph or greater). Knowing that the optimal speed is 55 mph when there is no wind may allow the system to inform the driver to slow down to 50 mph when there is a 5 mph headwind, and/or to accelerate to 60 mph (e.g., if allowed by the speed limit) when there is a 5 mph tailwind, for example.

A gyroscope integrated with a vehicle mounted unit may be used to measure changes to a vehicle's orientation. For example, when a vehicle begins to climb an incline, a gyroscope may be useful for detecting the scenario and/or providing a signal to an appropriate analysis model. Algorithms may therefore take into account that vehicles which are climbing hills necessarily consume more fuel and such consumption may be distinct from excess fuel consumption. In some implementations, the gyroscope may detect changes in an orientation of the vehicle to, for example, better understand characteristics of a turn. Output signals from the gyroscope may include information such as the angle of the turn (e.g., 90 degrees left, 180 degrees right (a U-turn)), a turn radius, speed into and out of a turn, and/or other information.

As described above, in some implementations, the system described herein may include a geo-location (e.g., GPS) determining means. In some implementations, excess fuel consumption algorithms may benefit from the additional accuracy with respect to speed measurements which may be realized in geo-location determining devices. While in standard vehicles the numbers are quite good for reporting instantaneous speed values to a driver, they are sometimes not useful for highly precise systems which require a high level of precision and certainty, for example some fuel consumption algorithms of these devices. For example, errors due to incorrect wheel/tire sizes might skew speed measurements whereby they do not reflect the true over ground speed. As such, a geo-location determining device may provide accurate speed information to certain excess fuel consumption calculations which require accurate speed measurements. Geo-location determining devices may also be used to measure vehicle altitude, which is yet another input that may describe vehicle inclination and/or road grade, and may be used to correct and/or validate any measurement errors that may arise from using the gyroscope, for example.

In some implementations, data from a geo-location device may be used by the system described herein to reverse geocode the current location of the vehicle and/or obtain parameters such as current traffic levels, road conditions (e.g., dry, wet, ice, snow, sleet), weather, wind speed, direction and/or other parameters. Such reverse geocoding may be done, for example, by transmitting a vehicle's current location to an internet server over a cellular connection, and then causing the server to retrieve the desired geocoded information.

These parameters may provide further explanatory power for fuel consumption measurements and/or calculation of target fuel consumption (e.g. do not penalize the driver for the additional friction associated with driving in 6" of snow).

Another sensor system which may be used in this excess fuel consumption monitoring and reporting system may be characterized as a video camera. A video camera produces a time series of images which may be machine processed to reach various conclusions from which excess fuel consumption determinations might depend. In one illustrative example a video analysis may be used to estimate following distance. Where close unwanted following is detected, a system may be put into "high alert" to watch for frequent, brief and irregular braking. Where frequent, brief and irregular braking is detected in conjunction with close following as determined by a video system, excess fuel consumption feedback signals may be triggered and asked to indicate to a driver that an adjustment is necessary. Video systems also produce images which can be analyzed for driving aids and control systems such as road signs and traffic signals. In some implementations, traffic light transitions from red to green are detected. When a red light turns to green, a driver should accelerate gently to traffic speed. However, if instead a driver accelerates quickly just after a green light, the driver may be provided an indication that fuel is wasted by such maneuvers. In some implementations, the video camera may be configured to detect speed limit signs such that the system may determine whether the vehicle is speeding (and wasting fuel). (This may also be determined, for example, at least in part via the GPS device).

As another example, when the traffic light transitions from green to amber to red, the driver may not let off the accelerator pedal until excessive braking is required (resulting in wasted fuel). The fuel consumed in the time between the light transition and the (unnecessary) braking can be considered to be waste. The cause could be driver inattentiveness, not looking far ahead, competitive driving, etc.

While heavy with advanced electronic subsystem and componentry, standard modern vehicles nevertheless do not include a complete suite of sensors from which intelligent excess fuel consumption determinations may be made. Accordingly some sensor subsystems may be added to those found standard in production vehicles and this system accounts for that and fully anticipates additional sensors which measure physical and performance parameters related to vehicle use and/or the environment in and/or around the vehicle.

A set of supporting external subsystem transducers may be installed as part of a vehicle event recorder unit where these sensors provide data to a logic processor arranged as part of an excess fuel consumption monitor and reporter/feedback system.

Figure 3:
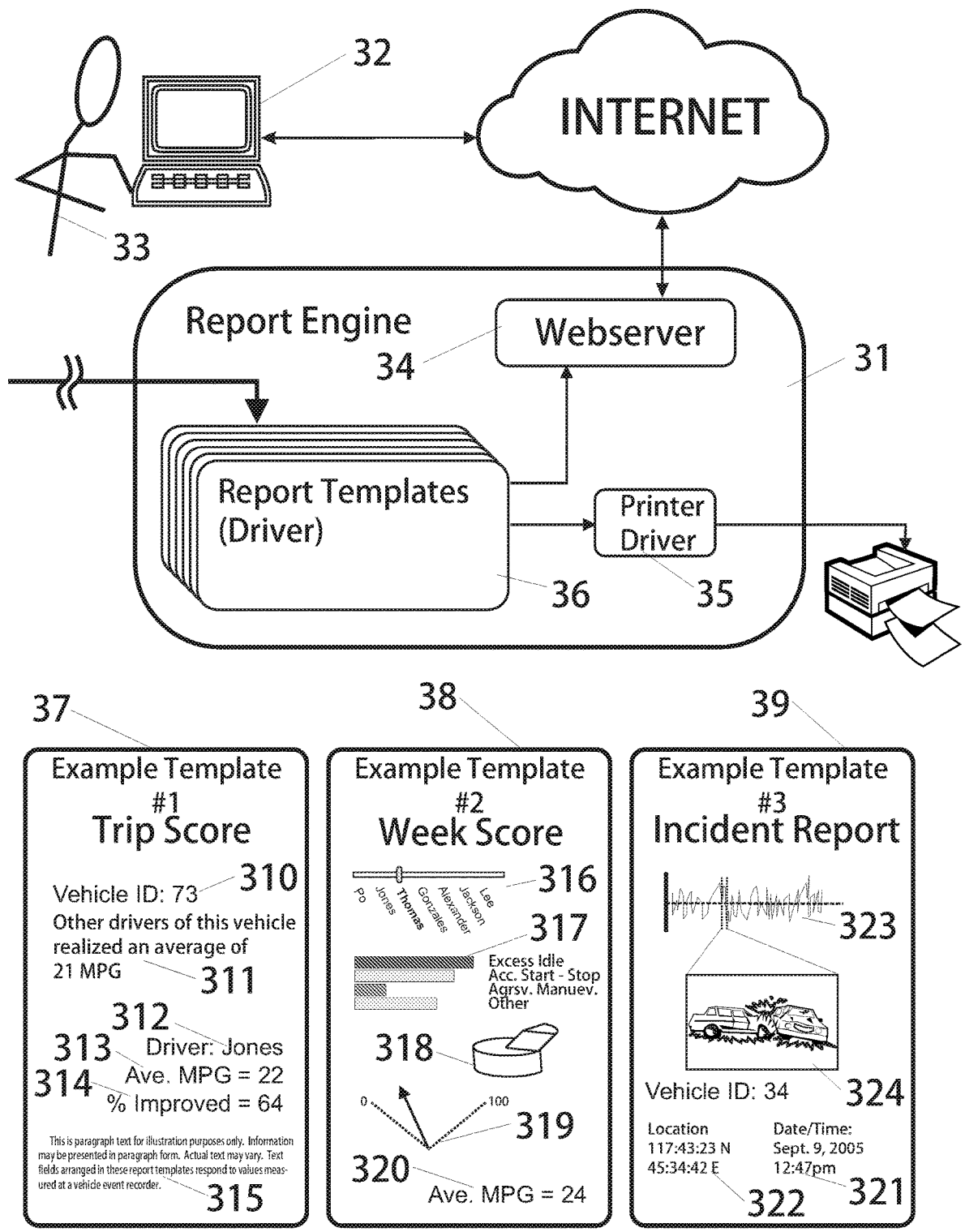
FIG. 3 is an abbreviated block diagram of a report engine and some illustrative outputs therefrom.

FIG. 3 is provided to illustrate a version of the report engine 31 element of this system. A report engine may be integrated with the vehicle mounted unit or may alternatively be deployed as part of a cooperating administration workstation in communication with the vehicle mounted unit. In either case, a report engine receives data from analysis module outputs. That received data is used to drive and set or control variable elements of prescribed report templates. Specifically, variable elements whose graphical or visual appearance changes in accordance with specific values provided.

Data about specific maneuvers as well as general statistics about the vehicle usage (trip duration, total fuel consumed during the trip, distance driven, % of time spend in specific bands of vehicle speed, etc.) may be collected and summarized into reports. The reports may cover multiple trips for a driver within the same vehicle or different vehicles, over a given time period, for example. The reports may also consolidate information about a group of drivers that are, for example, managed by the same supervisor.

In some implementations, for example, the summary and/or trend reports may identify drivers who waste the most fuel on either an absolute and/or relative basis. By way of a non-limiting example, the reports may allow users to look at the trends to see whether the excessive fuel consumption is a new development, a pattern that has remained unchanged for a period of time, or an area where the driver is improving but still needs further improvement. The reports may also be used for other purposes. For example, the reports may assist drivers in managing their own behavior on an aggregate basis, supervisors to identify drivers that need to be coached, etc.

Given that the information in the reports may be aggregated from the individual maneuvers, the reports may also identify what specific maneuvers and what element of each specific maneuver is the greatest contributor to the fuel waste. This may allow the drivers to focus their efforts and ensure better return (e.g. reduction in wasted fuel) for the effort invested on the driver's part to improve his or her behavior.

In some implementations, data about specific maneuvers, excessive fuel detection data, as well as other data that describes the vehicle usage, and/or other data may be communicated from apparatus 2 to a server that is capable of storing, analyzing and summarizing the data into reports. The data is typically organized in a structured format that supports direct insertion into relational or other types of databases. The data may be communicated through wireless (cellular, WiFi, other radio, etc) or wired (Ethernet, serial, USB, etc) methods.

By way of a non-limiting example, apparatus 2 may collect the data related to individual wasteful maneuvers as described herein into a CSV file, which is a readily-readable format. The CSV file may be transmitted to a backend system (e.g., the server described above, and/or other external computing workstations as described above), which parses the CSV file and loads the data into multiple tables in a relational database (e.g., a SQL Server). An ETL process may take the data from the tables and periodically populate a data warehouse, which may be another instance of a relational database (SQL Server), for example. The data may be transformed in a way that makes it possible to readily analyze the data and also link this data with other existing datasets, such as safety events. Data from the data warehouse may be periodically processed into data cubes (OLAP), which implement standard metrics and ratios, such as MPG, % MPG change period over period, etc. The cubes may also allow the massive amounts of data to be analyzed very quickly and efficiently. Finally, a business intelligence tool may be used to develop, prototype and run reports against the cubes.

Reports generated by these report engines may be embodied as static versions where all elements have a set and discrete single state in an executed template in view of data received from analysis modules, and dynamic versions where at least some of the variable elements of a report have an appearance and/or user interface responsive to user input actions such as touch, 'point-and-click', 'click-and-drag' and/or other computer periphery ('mouse')/touchscreen actions.

Static versions of these reports may be suitable for being embodied as a printed document, for example by way of a standard computer printer. Dynamic versions conversely are suitable for electronic presentation such as in a .PDF encoded document having minimally interactive elements (e.g. hyperlinks) or rather complex encoding supporting a very high level of user interactivity such as an .aspx encoded server/client documents with 'Java' and 'Flash' support comprised of a plurality of user interactive elements whose appearance is highly variable and dynamic in response to user inputs. These documents may be electronically transmitted over communications networks such as the Internet to remote workstations 32 where they may be viewed and manipulated by a fleet manager 33 for example. In these cases, a report engine is also comprised of a Web server component 34 which supports round-trip transactions operable for updating an instantaneous state of the electronically encoded report. To support static versions, a report engine may need, for example, only a printer driver 35 component to convert an executed template to an encoded signal transmitted to and understood by a printer.

A report engine may be comprised of a collection of prepared report templates 36. These templates have well defined graphical or visual elements whose visual appearance is variable and dependent upon data received from analysis modules. Each report template may be arranged to support feedback reporting of a different objective. For example, one of first template may be arranged to support reporting on excess fuel consumption with regard to a single trip or a single day. In such case, the visual elements of the template are specifically arranged to express data logically related to a single vehicle; a single user; and a single operator, for example. With reference to illustrative 'example template #1' 37, a 'Trip Score' report is provided as an executed template with respect to sample data. A second example executed template 38 relates to a 'week score' report with respect to a single driver fuel consideration performance over the course of a multiple day (e.g. a work week). In a third example developed for illustration purposes, an 'Incident Report' 39 type document feedback is righted to detail a specific incident related to excess fuel consumption such as an expected exception event or rules infraction.

The trip score template illustrated here includes six visual elements (not intended to be limiting) which are used to visually present fuel conservation integration based upon data captured at an array of sensors, that data being subject to analysis in accordance with rules encoded in certain analysis modules. Specifically, a vehicle identity text label 310 provides a vehicle identity code '73' to reference a particular vehicle from which the data was collected. A comparison value is presented in a sentence 311 "Other drivers of this vehicle realized an average of 21 MPG." Other examples of sentence 311 may include, "If driven in an ideal and/or target manner, this vehicle could have achieved an average of 21 miles per gallon" (e.g., given where it was driven, how heavily it was loaded, etc.). The numeric value '21' is a dynamic part of the 'trip score' template and depends upon data received from an analysis module output. Thus an analysis module may include maintenance of registers which hold fleet performance values.

Other text tables including portions which express values received from an analysis module may additionally include, for example, a Driver ID' 312, average mile per gallon 'Ave. MPG' 313; '% improvement' score 314, and/or other information.

In some implementations, "Ave. MPG" 313 and/or other fields may indicate the percentage of fuel consumed that represents waste, and/or an improvement thereof. As such, report fields may show the actual fuel consumption in gallons (for example), target fuel consumption, the difference between the two (waste), percentage waste, and/or other information. Driver improvement may then be shown as reduction in percentage of fuel wasted. For example, a report may state that Driver 1 used to waste 20% of fuel, but now wastes only 5% compared to the target fuel consumption for the vehicles that he drove and the situations in which he drove them.

A paragraph text field 315 may contain additional information to be presented to a driver or her supervisor as part of a 'Trip Report'. These text fields may be dynamically responsive to values conveyed from analysis modules to the report engine.

The example presented immediately prior hereto is a good illustration of a static report. Document feedback embodied as a static report has an array of visual elements where each element is set once in view of data supplied from an analysis module and thereafter does not change and provides no possibility for user interaction. Such report is suitable for printing on paper medium which does not support user interactivity. In contrast, executed template #2, a 'Week Score' feedback report includes at least one interactive component—a slider object 316 to permit a user to select a specific driver. By way of click-and-drag actions, an interested fleet manager selects from a group of drivers including: 'Po', 'Jones', 'Thomas', 'Gonzalez', 'Alexander', 'Jackson', and 'Lee'. In the illustration, the slider is set to "Thomas". The remaining controls are coupled to the slider selection whereby they express data specific to the selected driver (e.g. 'Thomas'). It should be noted that slider object 316 is shown and described as an example only. In some implementations, drop down boxes, combination boxes, and/or other controls may be included in addition to and/or instead of slider object 316. Other controls may be included because, for example, a slider control may limit the number of drivers that can be represented.

For example, a bar graph 317 graphically expresses the number of fuel conservation related incidents of four types including: 'excess idling infractions'; 'jackrabbit starts and stops'; 'aggressive maneuvers'; and 'other'. If the select driver slider is moved from Thomas' to 'Gonzalez', then the bar graph control is updated in response thereto to reflect the infractions of 'Gonzalez' rather than 'Thomas'. As such, some controls depend not only from data received from an analysis module, but additionally they may depend upon the states of other controls on the dynamic report. States of coupled control elements effect appearance changes in response to user selections and interactions of the dynamic report. This type of dynamic document is preferably encoded as an electronic document which may be expressed for example as a webpage in a standard Internet browser or rather as a window of a proprietary desktop application.

Other controls of the dynamic 'week score' document type report of this excess fuel consumption monitor and feedback system may include a dynamic pie chart 318 which changes shape for each driver to express fractional information.

A needle type 'analog' pointer 319 may be used to graphically present values computed at an analysis module, those values being dependent upon data collected over the course of a week long period, the data relating to a single driver as specified by the instantaneous state of the slider control. Thus, this example analog control may be coupled to data collected over an extended period (e.g. one week) and further coupled to the state of cooperating driver select control element.

A simple text label control 320 may similarly be bound to a data set whereby numeric data relating to a specified driver ('Thomas') and extended time period (week) is displayed. Thus, these dynamic templates are best embodied as interactive electronic documents in the form of webpages or desktop computer applications. Since a paper report does not support such user interactions, the slider of example template #2 is not suitable for use in paper feedback reports.

A third example, 'example template #3' 39, relates to a single event report—an 'incident report' delayed type feedback. Where a single event relating to an excess fuel consumption interaction is declared by the system, one form of feedback may be the 'incident report'. An incident report is distinct from the other report types as it may include visual elements specific to an instant in time 321 and a particular location 322. In the present illustrative case, an acceleration chart 323 which plots acceleration versus time may be addressed (by clicking) on any time instant (x value) replay video in a media player 324, that video which relates to an excess fuel consumption incident. In some analyses, an extreme sudden deceleration represents a fuel conservation infraction. By clicking on the acceleration chart of the incident report feedback, a driver or administrator or driver manager can become informed of video details leading to the sudden deceleration exception.

Figure 4:
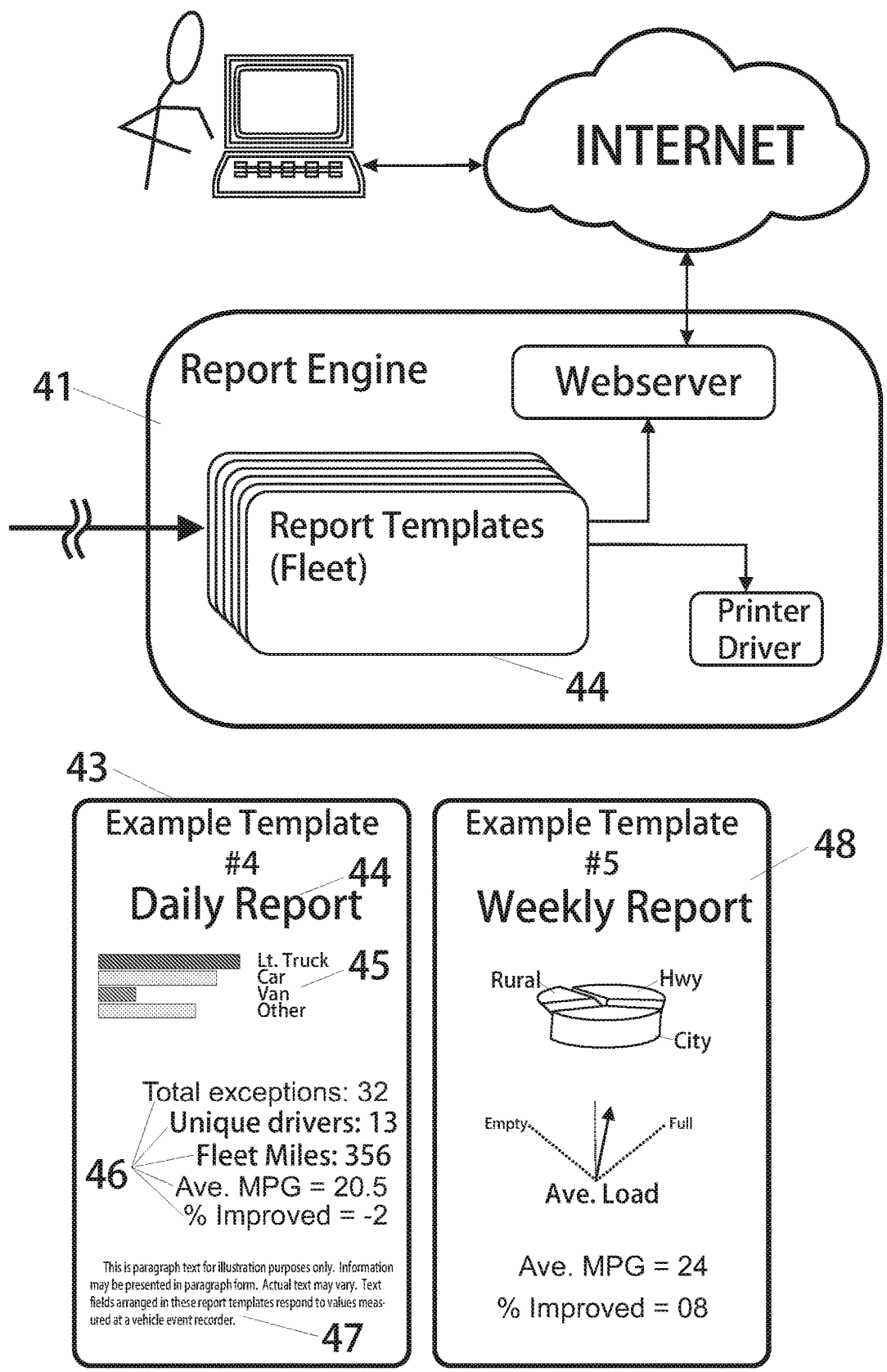
FIG. 4 is a similar abbreviated block diagram of another report engine and illustrative outputs of this version of a report engine.
Figure 5:
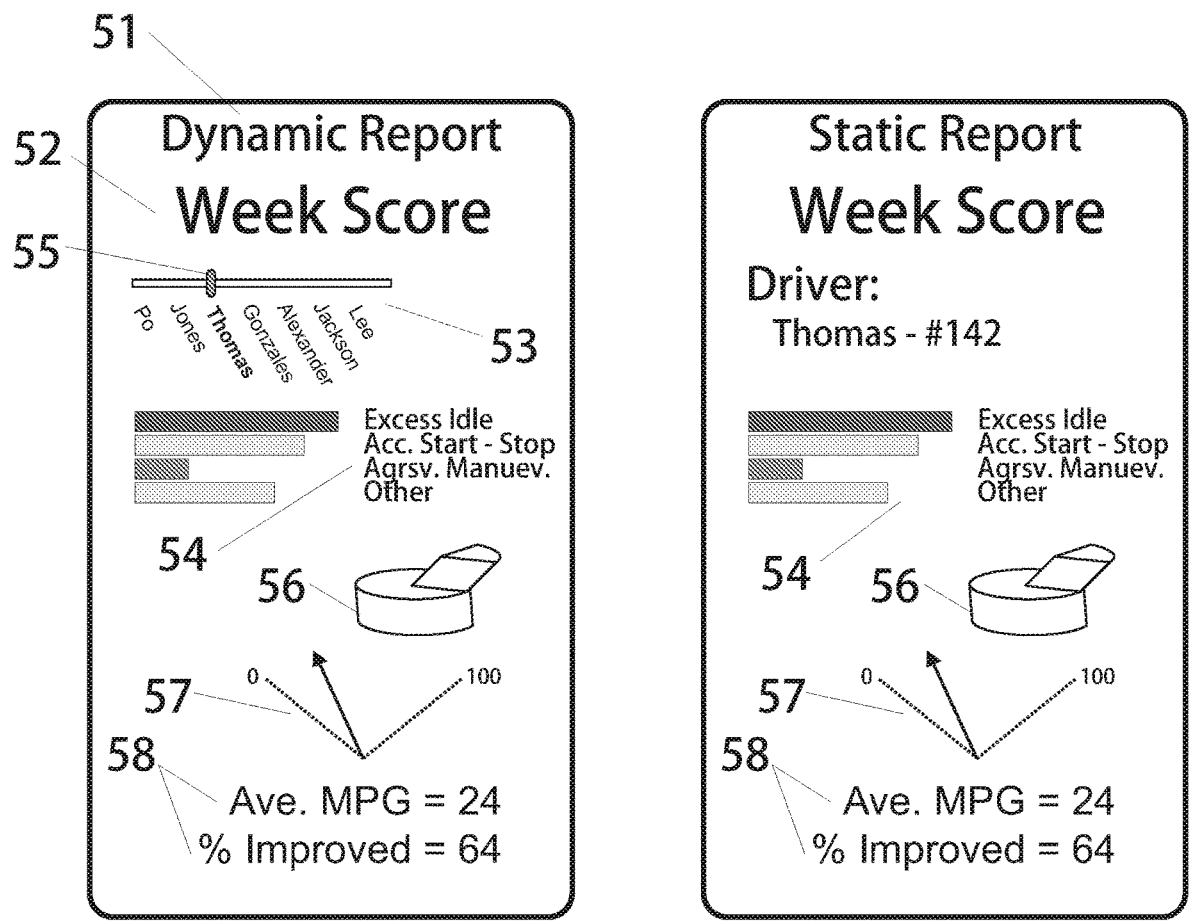
FIG. 5 illustrates two versions of feedback reports of this system.

FIG. 4 illustrates an aspect of feedback provided by this vehicle fuel consumption monitor and feedback system. FIG. 4 illustrates configurations which support reporting information compiled from a plurality of vehicles and/or an array of drivers. Fleet excess fuel consumption reports present visual representations of data from all cars and operators of a fleet. A fleet manager uses a fleet excess fuel consumption report feedback to make adjustments to fleet operations wherever those operations do not directly depend on any specific driver or specific vehicle.

An 'example template #4' 43 is arranged as a fleet 'daily report' 44 feedback document based upon information captured from a collection of vehicles having various drivers. The fleet may be described graphically as being comprised of areas of vehicle types in a bar graph 45 showing: 'light-truck'; 'car'; 'van'; and 'other'. Allocations of vehicle type may have effects on fleet fuel consumption and when considered in connection with others related data may provide a fleet manager useful means by which she makes adjustments to fleet operations.

Numeric data may be expressed in the text labels to express various measures useful in fleet operations management, each of these having dependence upon multiple vehicles and multiple drivers. A 'daily report' may additionally include a paragraph summary 47 of fuel use description—for example fuel price information and news. A weekly report 48 may similarly be directed to a fleet of vehicles driven by many drivers where different graphical elements are used to express time averaged values from data collected throughout the week or other details important to fleet use over extended time periods.

When feedback is expressed as an electronic document, the document may support dynamic playback of some stored data in a visual form which includes control objects as part of a graphical user interface.

In a 'dynamic report' 51 where a weekly score is presented for a plurality of related drivers 53, statistics for specific actions 54 associated with excess fuel consumption may be shown. When a graphical user interface control object characterized as a slider 55 is adjusted, data relating to a specific driver statistics is displayed. Each portion of the report is updated for any driver selection. In this way, an operator is presented a highly dynamic tool for making driver comparisons. These dynamic electronic document feedback embodiments may include graphical depictions each of which are driven by outputs from analysis algorithms. This type of non-real-time feedback may deploy items such as pie charts 56, analog meters 57 and numeric labels 58 for example.

Conversely, a static report which might be presented as a fixed electronic document (e.g. .pdf type) or even a printed document has no adjustments. The static report may however similarly include statistical data relating to a plurality of vehicles of a fleet but singularly to one specific driver.

Driver Specific Analysis

In some implementations, this system may be configured to provide a driver specific analysis of excess fuel consumption. That is, a vehicle independent analysis or rating for an individual vehicle operator is formed to quantify fuel consumption efficiency by way of a plurality of measures taken via a plurality of vehicle platforms. Often it is the case that a fleet administrator would like to have a more complete understanding of fuel use as it relates to a particular driver rather than details specific to any particular vehicle. Just as many physical attributes of a vehicle and its subsystems may affect fuel consumption, so too do many attributes of driver performance. In these cases, a 'feedback indicator' related to fuel consumption depends upon driver behavior rather than vehicle characteristics.

For example, apparatus 2 may aggregate information from various different vehicles and/or a single type of vehicle that the driver drove during an analysis period. The information may be normalized to show a percentage of fuel waste across different vehicle types and/or different vehicles, with the possibility to drill down and understand what percentage of the waste is attributable to a vehicle type. In some implementations, for example, apparatus 2 may determine that the driver is more efficient at driving smaller shuttle busses, but accelerates too fast when driving large busses. This may be useful feedback to the driver. Also, some concerns may be specific to types of the vehicles. For example, in automatic transmission vehicles transmission gear shift points are outside of a driver's control but become an important factor when the driver drives a type of vehicle with a manual transmission.

As another example, apparatus 2 may aggregate information from various routes driven by one or more drivers in one or more different types of vehicles during an analysis period. Individual routes may have associated route information. The route information may include information related to a route type (e.g., an express route, an urban city driving route, a rural road route, a fixed route, etc.), a time of day the route is driven, and/or other information. A route may be subdivided into slices. The slices may be determined based on timing (e.g., every 5 minutes driven on the route is a new slice), geographic location (e.g., a winding part of the road driven versus a straight road), traffic conditions, and/or other factors. The system may be configured to analyze and/or determine excess fuel consumption (e.g., provide a score to the driver) based the route information, the slices, and/or other information. For example apparatus 2 may determine ideal fuel consumption for the driver for an individual slice. Apparatus 2 may compare week to week fuel consumption information determined for the same individual slice. The week to week fuel consumption information for the slice may be summarized by driver (e.g., an individual driver's excess fuel consumption for a given slice (e.g., a score) may be compared to other drivers' excess fuel consumption for the same slice), vehicle type, time of day, traffic conditions, route type, and/or other factors. The route and/or slice information may be compared across a fleet of vehicles, drivers, and/or other factors. The examples given above are not intended to be limiting. The excess fuel analysis may be performed for any combination of factors that provides useful information to a driver, the driver's manager, and/or other users.

When a current driver drives a vehicle for which fuel consumption cannot be determined (e.g., there is no direct fuel consumption sensor), fuel consumption information may be estimated based on prior information related to the current driver's operation of similar vehicles and/or past drivers driving similar vehicles along the same route. The estimation may be made using at least some of the factors described above. For example, fuel consumption may be estimated based on drivers who drove similar vehicles on the same route at the same time of day. The estimation may be based on a slice by slice combination of the data generated for the other drivers. For example, when a vehicle lacks a fuel consumption sensor, information from other sensors on the current vehicle may be compared to the same and/or similar sensor information from past vehicles driven on the same route slices at the same time of day (e.g., under the same route conditions). Current fuel consumption may be estimated based on the similarities and/or differences between the current sensor information and the past sensor information. In some implementations, a driver may receive an excess fuel consumption score based on the other similar vehicles and/or the same but previously driven routes.

As another illustrative example, a fleet administrator oversees a fleet of vehicles and team of vehicle operators where each day's duty assignments might require a different operator for each vehicle. Over the course of a work week, a single driver may be assigned to several of the fleet vehicles. The administrator who wants a greater understanding of fuel consumption as it relates to particular drivers (e.g., with independence regarding fuel consumption variation intrinsic with fleet vehicles, routes, slices, etc.) may receive driver specific reporting from this system. In response to administrator requests for driver specific fuel consumption information, this system may provide a detailed accounting of all activity recorded and associated or attributed to a single driver, that detailed accounting being based upon data captured at a plurality of related vehicle onboard systems.

In some implementations, analysts may review the factor based (e.g., by driver, by route, by slice, by vehicle, etc.) data generated by the system and adjust one or more algorithms used by the system.

In some implementations, the vehicle excess fuel consumption monitor and/or reporting device is made up of four primary elements including a transducer or plurality of transducers coupled to engine and vehicle subsystems and environments, a logic processor which receives output signals from those transducers, processes those signals in agreement with stored logic code which includes presets, and finally, driver feedback indicators which reflect conditions related to excess fuel consumption. For example, a transducer may include a fuel flow transducer which detects flow rates of fuel in a stream or conduit. Logic code may compare instantaneous fuel flow values with prescribed references or presets to declare exception conditions. When an exception arises, an appropriate feedback signal may be sent to the feedback indicators to alert the driver of the existence of the exception condition. Upon receipt of same feedback, a driver is inclined to expeditiously modify his behavior to improve the conditions which gave rise to the exception.

While a fuel flow rate transducer is but one example of a transducer from which certain preferred algorithms may be provided, other transducers may include an air flow transducer. Fuel consumption rates may be implicitly derived from engine air intakes measurements. As such, fuel consumption exceptions may similarly be declared based upon algorithms executed in view of presets which relate to air intake rates. Accordingly, this system also includes devices based upon air intake transducers.

It should be fully appreciated that some algorithms used to monitor fuel consumption have dependence upon multiple transducers and/or related measurement systems. For an illustrative example, one algorithm may have input parameters from the vehicle braking system and fuel flow system. It is clear that while braking it is rarely or never useful to simultaneously be consuming fuel. Accordingly, an exception might be declared by one algorithm whenever it is detected that a driver is braking while at the same time depressing the accelerator. This example is provided to clearly show multiple dependence on various engine systems, it will be appreciated that more complex multiple dependencies will find many opportunities in various alternative versions of this system.

One advantage of this system may relate to the ability to couple with standardized motor vehicle installations. For example, common manufactured vehicles may include one or more Engine Control Modules (ECM), an Engine Control Unit (ECU), a communications bus, an onboard databus (OBD), and/or other components. Data and communications protocols used in vehicle ECM and/or OBD systems may be suitable for cooperation with devices taught herein. This fuel consumption monitor and feedback system may couple with vehicle ECM and/or OBD systems whereby parametric input to certain algorithms may be received directly from the ECM and/or via the OBD. This may permit some versions of these devices to depend upon detectors and transducers preinstalled by the vehicle manufacturer. While some detectors and measurement devices from which this system depend may be installed after vehicle manufacture in an 'after-market' installation, others are installed when a vehicle is originally made.

In some implementations, having compound dependence on a plurality of transducers may include dependence on transducers originally installed during vehicle manufacture and further dependence on transducers installed in an aftermarket installation. In this way, special high performance algorithms may be put in place to further improve feedback quality which most effectively improves driver performance in real-time and in after-the-fact driver performance review.

One example of a measurement system not typically included in standard vehicles but which may be useful in these fuel consumption monitor apparatus may be characterized as a triaxial accelerometer. Accelerometers may be installed as part of an aftermarket system whereby vehicle accelerations may be monitored. In conjunction with other signals, certain algorithms arranged to support fuel conservation objectives might depend upon signals provided by the accelerometers. For example, if a fuel flow transducer indicates high rate of flow while an accelerometer indicates the vehicle is accelerating at a high rate—a fuel consumption exception might be declared. It is rarely an essential part of driving that high forward accelerations are necessary. In good conservative fuel use practices, gentle forward accelerations are preferred. Therefore, after-market transducers installed in support of this system may include accelerometer devices among other types of transducers for measuring either vehicle engines subsystem performance or general vehicle environment parameters and states.

In another useful illustrative example of aftermarket transducers, a gyro system for determining directional changes is sometimes useful in versions of this excess fuel consumption monitor system. Both gyro and electronic compass devices may be used to measure direction and directional changes which can be used to support various algorithms which relate to fuel use. Accordingly, this system may include excess fuel consumption monitoring having dependence on vehicle direction and vehicle directional changes.

In some implementations, this excess fuel consumption feedback system may include use of video camera devices. Output from video cameras may be used in at least two or more ways. For example, video recordings of specific fuel use related events may be used for providing a driver detailed information relating to driving behavior. An electronic report on driver performance may include video replay of certain events related to fuel use. In some implementations, images from a vehicle mounted video camera may be analyzed with pattern recognition logic to reveal conditions unfavorable to conservative fuel use and exceptions may be declared where an algorithm has dependence on video image pattern recognition.

For example, it is relatively easy to detect from a forward view video scene the changing of an illuminated traffic signal—or 'stoplight' from a 'green light' signal to a 'red light' signal. If a driver is late to remove pressure from the accelerator in response to a traffic light change, a fuel use exception may be declared. In careful driving strategies (with respect to fuel consumption) it is most useful to remove all application of accelerator the instant a red light or yellow light appears. Therefore, when drivers continue consuming fuel unnecessarily when an imminent stop is known to be coming, that fuel use is wasteful.

In some implementations, a similar effect may be arranged about the red brake lights of cars ahead. While it is not always true, in many cases application of brakes by drivers in vehicles ahead indicate slowing. Continued application of accelerator pressure when drivers ahead are braking generally indicates a waste of fuel. Drivers most generally should remove pressure from an accelerator when cars ahead indicate braking. Accordingly, algorithms of this system include predictive algorithms which might depend upon image pattern recognition from image scenes about a vehicle environment (e.g. cars ahead). For purposes of this disclosure, we consider the video camera a 'transducer' (e.g.

'an image transducer') and these excess fuel consumption algorithms which may be executed at a logic processor to realize driver feedback may depend therefrom.

Although many versions of this system described herein relate to those which have instantaneous feedback mechanisms such as lighted indicators or audio indicators in a driver compartment portion of a vehicle, other versions support a feedback which is delivered 'after-the-fact'. That is, excess fuel consumption feedback is provided after a driving session is completed. This may include at the end of the service day—or might include a time averaged period such as at the end of a work week. In either case, excess fuel consumption feedback provided as after the fact feedback is most generally delivered in the form of a written or electronic report. A report engine receives information compiled over the course of a vehicle use period, and that information is used to construct a report which serves to inform a driver with regard to fuel consumption behavior. Therefore, output from these apparatus might include feedback in the form of a printed report or document. Where fuel consumption data and results are provided as driver feedback in a dynamic form, it may be embodied as an 'electronic document'. For example, an HTTP encoded web page having dynamic controls therein may be used to express driver performance as it relates to excess fuel consumption. Accordingly, 'feedback indicators' of this system include both printed documents and dynamic documents such as electronic documents encoded as interactive web pages. In some implementations, a driver is provided an I/O system via which he may manipulate operational modes of the device. Some versions of this system may be arranged to support a plurality of alternative operational modes. An authorized driver may switch the system between these operational modes. For example, a driver may set the system into a more conservative fuel consumption warning scheme—via the I/O device. In one preferred version, an I/O device might be arranged as a touchscreen device whereby a user/driver might interact with a prescribed menu to make selections and arranged settings and options prior to beginning a driving route. In this way, the feedback warnings and indications may be provided to the driver in agreement with a selected mode made prior to a journey or route. Accordingly, this excess fuel consumption feedback system includes alternative operational modes and/or means for a driver to shift the system between these modes.

One will now fully appreciate how vehicle excess fuel consumption monitor and feedback system may be realized. Although the present invention has been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to detect and report excess fuel consumption in vehicles, wherein the vehicles include a first vehicle, wherein the first vehicle is associated with a first driver, the system comprising:
   a user interface configured to facilitate interaction between the first driver and the system; and
   one or more processors configured via computer-readable instructions to:
      detect a first vehicle maneuver based on one or more first vehicle parameters related to operation of the first vehicle, wherein the first detected vehicle maneuver includes one or more of hard acceleration, hard braking, driving at a constant speed in a suboptimal gear, speeding beyond an optimal top speed, idling unnecessarily, hard cornering, over revving the engine of the first vehicle, inefficiently shifting gears, inefficient acceleration, inefficient braking, inefficient operation of the first vehicle given prevailing driving conditions, and/or speeding uphill;
      determine actual fuel consumption by the first vehicle during the first detected vehicle maneuver;
      detect a first consumption difference, wherein the first consumption difference is detected based on a difference between a first actual fuel consumption amount and a first target fuel consumption amount, wherein the first actual fuel consumption amount is based on the actual fuel consumption by the first vehicle during the first detected vehicle maneuver, wherein the first target fuel consumption amount is based on an estimation of a first amount of fuel that would have been consumed by the first vehicle at the time of the first detected vehicle maneuver if the first vehicle had been operated so as to prevent excessive fuel consumption; and
      effectuate presentation of the first consumption difference to the first driver via the user interface.

2. The system of claim 1, wherein the one or more processors are further configured to:
   detect a second consumption difference for the first vehicle, wherein the second consumption difference is detected based on a second difference between a second actual fuel consumption amount and a second target fuel consumption amount, wherein the second actual fuel consumption amount is based on actual fuel consumption by the first vehicle during a second detected vehicle maneuver, wherein the second detected vehicle maneuver is detected based on one or more second vehicle parameters related to operation of the first vehicle, wherein the second target fuel consumption amount is based on an estimation of a second amount of fuel that would have been consumed by the first vehicle at the time of the second detected vehicle maneuver if the first vehicle had been operated so as to prevent excessive fuel consumption; and
   effectuate presentation of the second consumption difference via the user interface.

3. The system of claim 2, wherein the one or more processors are further configured to:
   generate a report based on a comparison of the first consumption difference and the second consumption difference; and
   effectuate presentation of the report via the user interface.

4. The system of claim 1, wherein the one or more first vehicle parameters are based on output signals generated by one or more sensors of the first vehicle.

5. The system of claim 4, wherein the one or more sensors measure one or more of movement of the first vehicle, an orientation of the first vehicle, a position of the first vehicle, a velocity of the first vehicle, and/or an acceleration of the first vehicle.

6. The system of claim 1, wherein the one or more first vehicle parameters are related to one or more of the actual fuel consumption by the vehicle, an engine of the first vehicle, a braking system of the first vehicle, a transmission of the first vehicle, and/or a drive train of the first vehicle.

7. The system of claim 1, wherein the first detected vehicle maneuver is associated with excessive fuel consumption.

8. The system of claim 3, wherein the presentation of the report indicates information related to the first consumption difference.

9. The system of claim 8, wherein the information related to the first consumption difference includes a recommendation for the first driver to modify his or her operation of the first vehicle in a manner that reduces occurrences of vehicle maneuvers associated with excessive fuel consumption.

10. A method to detect and report excess fuel consumption in vehicles, wherein the vehicles include a first vehicle, wherein the first vehicle is associated with a first driver, the method being implemented in a computer system, the method comprising:
    facilitating interaction between the first driver and the computer system;
    detecting a first vehicle maneuver based on one or more first vehicle parameters related to operation of the first vehicle, wherein the first detected vehicle maneuver includes one or more of hard acceleration, hard braking, driving at a constant speed in a suboptimal gear, speeding beyond an optimal top speed, idling unnecessarily, hard cornering, over revving the engine of the first vehicle, inefficiently shifting gears, inefficient acceleration, inefficient braking, inefficient operation of the first vehicle given prevailing driving conditions, and/or speeding uphill;
    determining actual fuel consumption by the first vehicle during the first detected vehicle maneuver;
    detecting a first consumption difference, wherein the first consumption difference is detected based on a difference between a first actual fuel consumption amount and a first target fuel consumption amount, wherein the first actual fuel consumption amount is based on the actual fuel consumption by the first vehicle during the first detected vehicle maneuver, wherein the first target fuel consumption amount is based on an estimation of a first amount of fuel that would have been consumed by the first vehicle at the time of the first detected vehicle maneuver if the first vehicle had been operated so as to prevent excessive fuel consumption; and
    effectuating presentation of the first consumption difference to the first driver via the user interface.

11. The method of claim 10, further comprising:
    detecting a second consumption difference for the first vehicle, wherein the second consumption difference is detected based on a second difference between a second actual fuel consumption amount and a second target fuel consumption amount, wherein the second actual fuel consumption amount is based on actual fuel consumption by the first vehicle during a second detected vehicle maneuver, wherein the second detected vehicle maneuver is detected based on one or more second vehicle parameters related to operation of the first vehicle, wherein the second target fuel consumption amount is based on an estimation of a second amount of fuel that would have been consumed by the first vehicle at the time of the second detected vehicle maneuver if the first vehicle had been operated so as to prevent excessive fuel consumption; and
    effectuating presentation of the second consumption difference via the user interface.

12. The method of claim 11, further comprising:
    generating a report based on a comparison of the first consumption difference and the second consumption difference; and
    effectuating presentation of the report via the user interface.

13. The method of claim 10, wherein the one or more first vehicle parameters are based on output signals generated by one or more sensors of the first vehicle.

14. The method of claim 13, wherein the one or more sensors measure one or more of movement of the first vehicle, an orientation of the first vehicle, a position of the first vehicle, a velocity of the first vehicle, and/or an acceleration of the first vehicle.

15. The method of claim 10, wherein the one or more first vehicle parameters are related to one or more of the actual fuel consumption by the vehicle, an engine of the first vehicle, a braking system of the first vehicle, a transmission of the first vehicle, and/or a drive train of the first vehicle.

16. The method of claim 10, wherein the first detected vehicle maneuver is associated with excessive fuel consumption.

17. The method of claim 10, further comprising:
    effectuating generation and presentation of a report to a fleet manager of a fleet of multiple vehicles, wherein the fleet includes the first vehicle, wherein the report indicates information related to the first consumption difference.

18. The method of claim 17, wherein the report includes a recommendation for the first driver to modify his or her operation of the first vehicle in a manner that reduces occurrences of vehicle maneuvers associated with excessive fuel consumption.

* * * * *